US010877056B2

(12) United States Patent
Sattler

(10) Patent No.: US 10,877,056 B2
(45) Date of Patent: Dec. 29, 2020

(54) LOADING DEVICE FOR LOADING A REAGENT ROTOR OF AN ANALYTICAL INSTRUMENT WITH REAGENT VESSELS AND ANALYTICAL INSTRUMENT

(71) Applicant: Roche Diagnostics Operations, Inc., Indianapolis, IN (US)

(72) Inventor: Stephan Sattler, Starnberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 227 days.

(21) Appl. No.: 15/647,345

(22) Filed: Jul. 12, 2017

(65) Prior Publication Data

US 2017/0307643 A1    Oct. 26, 2017

Related U.S. Application Data

(63) Continuation of application No. PCT/EP2016/051077, filed on Jan. 20, 2016.

(30) Foreign Application Priority Data

Jan. 23, 2015 (EP) .................................. 15152243

(51) Int. Cl.
*G01N 35/04* (2006.01)

(52) U.S. Cl.
CPC ..... *G01N 35/04* (2013.01); *G01N 2035/0439* (2013.01); *G01N 2035/0443* (2013.01); *G01N 2035/0465* (2013.01)

(58) Field of Classification Search
None
See application file for complete search history.

(56) References Cited

U.S. PATENT DOCUMENTS

| 4,678,752 A | 7/1987 | Thorne et al. |
| 4,900,513 A * | 2/1990 | Barker .................. G01N 35/04 198/346.1 |

(Continued)

FOREIGN PATENT DOCUMENTS

| AU | 2013202805 A1 | 10/2014 |
| EP | 1225450 A1 | 7/2002 |

(Continued)

OTHER PUBLICATIONS

Yamashita, Tadashi et al., Automatic sorting and conveying device with a rotary table using a Geneva mechanism—Skills and Techniques, Journal of Professional Development Technology, 2008, pp. 39-44, vol. 43, Issue 5.

*Primary Examiner* — Kathryn Wright
(74) *Attorney, Agent, or Firm* — Roche Diagnostics Operations, Inc.

(57) ABSTRACT

A loading device for loading a reagent rotor of an analytical instrument with reagent vessels is disclosed. The loading device comprises a tray to receive reagent vessels. The tray moves within a first plane at least between a loading position, at which the tray is loadable with the reagent vessels, and an unloading position, at which the reagent vessels are unloadable from the tray. The loading device also comprises a transporting device for transporting the reagent vessels from the tray to the reagent rotor of the analytical instrument. The tray is formed such that the transporting device is linearly moveable within a second plane from the unloading position of the tray to the reagent rotor and/or from the reagent rotor to the unloading position of the tray. The first plane and the second plane are different from one another. The tray is formed as a circular ring segment.

7 Claims, 19 Drawing Sheets

(56) References Cited

U.S. PATENT DOCUMENTS

| | | |
|---|---|---|
| 5,075,079 A | 12/1991 | Kerr et al. |
| 5,424,036 A | 6/1995 | Ushikubo |
| 5,833,925 A | 11/1998 | Shu et al. |
| 2004/0134750 A1 | 7/2004 | Luoma, II |
| 2004/0186360 A1 | 9/2004 | Suzuki et al. |
| 2005/0207938 A1* | 9/2005 | Hanawa ............. G01N 35/1002 422/64 |
| 2005/0227360 A1 | 10/2005 | Devlin, Sr. |
| 2006/0245865 A1 | 11/2006 | Babson |
| 2011/0262303 A1 | 10/2011 | Burkhardt et al. |
| 2013/0017535 A1 | 1/2013 | Frey et al. |
| 2014/0141518 A1 | 5/2014 | Pufahl |
| 2015/0010436 A1 | 1/2015 | Okusa et al. |
| 2017/0023450 A1 | 1/2017 | Ashby et al. |

FOREIGN PATENT DOCUMENTS

| | | |
|---|---|---|
| EP | 2020263 A1 | 2/2009 |
| EP | 2784516 A1 | 10/2014 |
| JP | 2001-116757 A | 4/2001 |
| JP | 2013-231701 | 11/2013 |
| WO | 2008/123882 A1 | 10/2008 |

\* cited by examiner

LOADING DEVICE FOR LOADING A REAGENT ROTOR OF AN ANALYTICAL INSTRUMENT WITH REAGENT VESSELS AND ANALYTICAL INSTRUMENT

CROSS-REFERENCE TO RELATED APPLICATIONS

This application is a continuation of PCT/EP2016/051077, filed Jan. 20, 2016, which is based on and claims priority to EP 15152243.0, filed Jan. 23, 2015, which is hereby incorporated by reference.

BACKGROUND

The present disclosure relates to a loading device for loading a reagent rotor of an analytical instrument with reagent vessels and an analytical instrument.

Analytical instruments and, more particularly, medical analytical instruments serve to examine body fluids, especially blood, or any other reagents used in the medical field. Modern analytical instruments of this kind are largely fully automatic in operation and only the samples stored in reagent vessels have to be inserted into the analytical instruments and the desired analysis has to be entered.

Analytical instruments operate with liquid reagents contained in reagent vessels which may be made of plastics. The instruments usually have a loading device for loading a reagent rotor of the analytical instrument with reagent vessels. A reagent rotor is a device which transports reagent vessels loaded thereon to an analytical position, at which the reagent vessels are used for the desired analysis. Usually, the samples stored in the reagent vessels are withdrawn from the reagent vessels by pipette probes of a pipettor at the analytical position. Particularly, the pipette probe of the pipettor is fastened to a movable arm, dips from above through the open reagent vessel and an appropriate amount of reagent is sucked in and transferred in the pipette probe, which is also known as transfer needle, to the reaction vessel. In order to provide the reagent rotor with the reagent vessels, usually a tray, onto which the reagent vessels are loaded, and a transporting device are used. The tray is usually linearly moved, whereas the transporting device moves in all three dimensions of space.

Using the above-described loading devices with an analytical instrument provides advantages concerning the handling. Nevertheless, there are still some drawbacks. Particularly, the movement of the tray and the transporting device requires several motors and guiding devices, sensors, adjusting devices and the like, such that the loading devices are complicated in their construction and, therefore, expensive. Further, in order to move the transporting device in all three dimensions of space more than one motor is necessary. For example, each of the three planes is associated with one motor. The provision of more than one motor requires a significant effort of adjustment of the motors regarding any tolerances of the movement in the single planes forming the three dimensional space as otherwise these tolerances may sum up to an undesired impreciseness of movement, which causes disturbances in operation of the analytical instrument.

Therefore, there is a need for a loading device for loading a reagent rotor of an analytical instrument with reagent vessels and an analytical instrument, which are less complex in their construction and provide a more accurate handling of the reagent vessels.

SUMMARY

According to the present disclosure, a loading device for loading a reagent rotor of an analytical instrument with reagent vessels is presented. The loading device can comprise a tray adapted to receive a plurality of reagent vessels. The tray can be movable within a first plane at least between a loading position, at which the tray is loadable with the plurality of reagent vessels, and an unloading position, at which the plurality of reagent vessels are unloadable from the tray. The loading device can also comprise a transporting device for transporting the plurality of reagent vessels from the tray to the reagent rotor of the analytical instrument. The tray can be formed such that the transporting device can be linearly moveable within a second plane from the unloading position of the tray to the reagent rotor and/or from the reagent rotor to the unloading position of the tray. The first plane and the second plane can be different from one another. The tray can be formed as a circular ring segment In accordance with one embodiment of the present disclosure, an analytical instrument is also disclosed.

Accordingly, it is a feature of the embodiments of the present disclosure to provide a loading device for loading a reagent rotor of an analytical instrument with reagent vessels and an analytical instrument, which are less complex in their construction and provide a more accurate handling of the reagent vessels. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
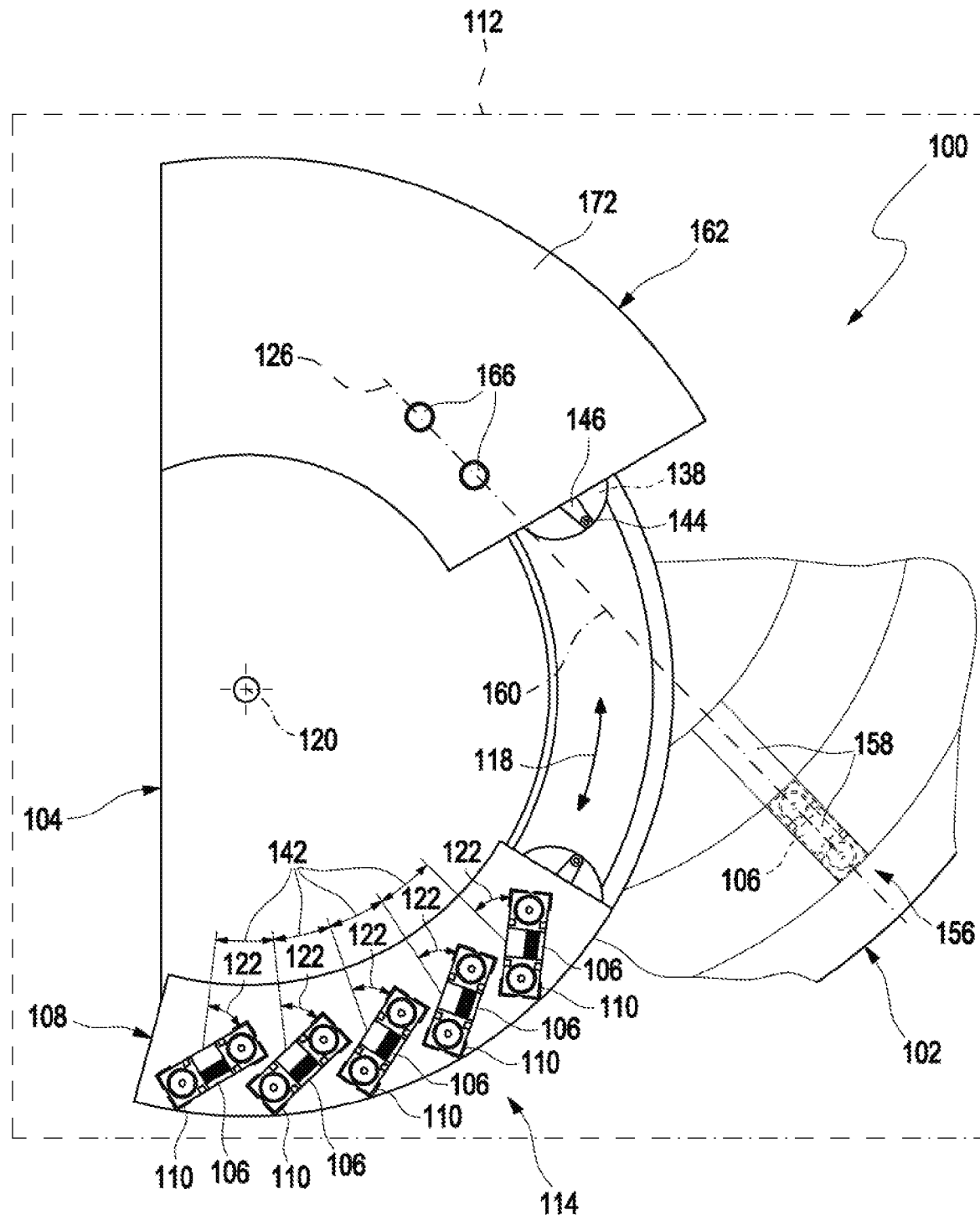
FIG. 1 illustrates an analytical instrument according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As used in the following, the terms "have", "comprise" or "include" or any arbitrary grammatical variations thereof can be used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it can be noted that the terms "at least one", "one or more" or similar expressions indicating that a feature or element may be present once or more than once typically can be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms can be used in conjunction with optional features, without restricting alternative possibilities. Thus, features introduced by these terms can be optional features and may not be intended to restrict the scope of the claims in any way. The present disclosure may, as the skilled person can recognize, be performed by using alternative features. Similarly, features introduced by "in an embodiment" or similar expressions can be intended to be optional features, without any restriction regarding alternative embodiments, without any restrictions regarding the scope and without any restriction regarding the possibility of combining the features introduced in such way with other optional or non-optional features.

A loading device for loading a reagent rotor of an analytical instrument with reagent vessels is disclosed. The loading device can comprise a tray adapted to receive a plurality of reagent vessels. The tray can be movable within a first plane at least between a loading position, at which the tray can be loadable with the plurality of reagent vessels, and an unloading position, at which the plurality of reagent vessels can be unloadable from the tray, and a transporting device for transporting the plurality of reagent vessels from the tray to the reagent rotor of the analytical instrument. The tray can be formed such that the transporting device can be linearly moveable within a second plane from the unloading position of the tray to the reagent rotor and/or from the reagent rotor to the unloading position of the tray. The first plane and the second plane can be different from one another. Thus, the transporting device may move within a single plane for transferring a reagent vessel to the reagent rotor or vice versa. Thereby, several motors for moving the transporting device in different directions of a three dimensional space may be omitted but a single motor can be necessary. This can avoid an adjustment or compensation of any movement tolerances.

The second plane may be perpendicular to the first plane. Thus, the complete construction of the loading device may be simplified as the tray and the transporting device can only move perpendicular to one another.

The tray may be formed as a circular ring segment. Thus, the tray may be more compact when compared to a rectangular tray. Further, the tray may be moveable on a circular path. Thus, the tray may be pivoted or rotated around a fixed position.

The circular path may define a middle point. The tray can comprise compartments for receiving the plurality of reagent vessels. The compartments can be arranged at even angular positions around the middle point of the circular path. Thus, the distances between the respective compartments can be identical.

The second plane may be spaced apart from the middle point of the circular path. Thus, the rotational movement of the tray may not obstruct the movement of the transporting device.

Alternatively, the tray may comprise compartments for receiving the plurality of reagent vessels, which can be arranged in a row. Thus, the loading device may be integrated into analytical instruments requiring a different shape of the tray.

The transporting device may comprise a gripping device for gripping the reagent vessel. The gripping device can be arranged at a leading end of the transporting device. Thus, the transporting device may grip a reagent vessel in order to transfer the same from the tray to the reagent rotor and vice versa.

The transporting device may comprise at least one piercing device for piercing the reagent vessel. Thus, the reagent vessel may be provided with an opening allowing a pipette probe of the pipettor of the analytical instrument to enter the reagent vessel. The piercing device may be arranged so as to be moveable within the second plane. Thus, the piercing device may pierce the reagent vessel at the same position at which the reagent vessel is transferred from the tray.

The piercing device may comprise at least a first piercing needle for piercing the reagent vessel and for widening an opening generated by the first piercing needle. Thus, the reagent vessel may be provided with an opening allowing a pipette probe of the pipettor of the analytical instrument to enter the reagent vessel with a simple construction.

Alternatively, the piercing device may comprise a first piercing needle for piercing the reagent vessel and a second piercing needle for widening an opening generated by the first piercing needle. In this case, the second piercing needle may be arranged closer to the gripping device than the first piercing needle.

The piercing device may be integrally moveable with the transporting device. Thus, operation of the piercing device may not require a separate motor but may be operated together with the transporting device by the motor of the transporting device. The piercing device may be arranged adjacent to the gripping device. Thus, the transporting device can comprise all components for handling and preparing the reagent vessel in a compact manner.

The loading device may further comprise at least one motor for moving the tray. In one embodiment, the motor can be adapted to move the tray stepwise with predetermined steps. Thus, the motor may move the reagent vessels with predetermined dimensions. In one embodiment, the predetermined step can comprise identical dimensions. Thus, the motor may move the reagent vessels with predetermined identical dimensions. A dimension of the predetermined steps may correspond to a distance between two adjacent reagent vessels. Thus, the reagent vessels may be moved always a step further.

The tray may comprise at least one groove. The motor may comprise at least one pin. The groove can be adapted to engage the pin. Thus, the tray may be moved by engagement of the groove and the pin.

The tray may comprise an assembly of evenly spaced apart grooves. The motor may be adapted to move the tray stepwise with the predetermined steps by engagement of the grooves and the pin. Thus the tray may be moved with a simple construction and in an exact manner.

The pin may be arranged on a crank or disc. The motor can be adapted to rotate the crank or disc. Thus, the tray may be moved when the motor rotates the crank or disc.

In one embodiment, the step motor can comprise two pins arranged opposite to one another having a middle point of the crank or disc therebetween. Thus, the tray may be moved by alternating engagement of the pins and the grooves.

The grooves may be arranged at a lower side of the tray. Thus, the motor may be disposed below the tray.

The motor may be arranged close to the second plane. Thus, a compact construction can be provided. For example, the motor may be arranged close to the unloading position of the tray.

Alternatively, the loading device may further comprise a plurality of motors for moving the tray. The motors can be synchronized. For example, the motors may be synchronized by sensors. Alternatively, the motors may be mechanically coupled to one another. For example, the motors may be coupled to one another by a belt or a gear drive.

The loading device may be adapted to be arranged within the analytical instrument such that the first plane can be substantially parallel to the reagent rotor. Thus, the tray may be exactly arranged with respect to the reagent rotor in order to allow the transporting device to load and unload reagent vessels to and from the reagent rotor without tilting.

An analytical instrument is disclosed. The analytical instrument can comprise a reagent rotor and a loading device as described above.

The analytical instrument may further comprise a cooling device for cooling the plurality of reagent vessels. The cooling device may be arranged within a moving direction of the tray. Thus, any reagent vessels not directly used with an analytical process of the analytical instrument may be cooled in order to prevent any deterioration or variation of the characteristics of the content of the reagent vessel.

The tray may be moveable into a final position arranged behind the unloading position as seen in a moving direction from the loading position to the unloading position. The cooling device may be arranged so as to house the plurality of reagent vessels at the final position of the tray. Thus, the cooling device may be integrated into the analytical instrument in a compact manner.

The transporting device may comprise at least one piercing device. The analytical instrument may comprise at least one cleaning station for cleaning the piercing device. Thus, the piercing device may be cleaned within the analytical instrument. The cleaning station may be arranged at a moving path of the transporting device. Thus, the transporting device may be used in order to move the piercing device to the cleaning station. Thus, a separate component for moving piercing device to the cleaning station can be omitted.

The reagent rotor may comprise a plurality of reagent rotor loading positions, at which the plurality of reagent vessels can be loadable onto the reagent rotor. The reagent rotor may be rotatable such that at least one of the reagent rotor loading positions can be arranged within the second plane. Thus, the transporting device may transfer the reagent vessel to the reagent rotor with a simple construction.

The plurality of reagent rotor loading positions may be arranged so as to form groups of two reagent rotor loading positions adjacent to one another within a third plane. Thus, the reagent vessels may be disposed onto the reagent rotor in a compact manner.

The reagent rotor may be rotatable such that at least the third plane can overlap the second plane. Thus, the reagent vessels may be disposed onto the reagent rotor by the transporting device without the necessity of being moved again on the reagent rotor.

The analytical instrument may further comprise a RFID sensor for identifying a RFID tag provided on the reagent vessel. The RFID sensor may be arranged within the moving path of the tray between the loading position and the unloading position. Thus, any information concerning the reagent vessel may be read by the analytical instrument.

The analytical instrument may further comprise an orientation sensor for detecting an orientation of the reagent vessel. Thus, the analytical instrument may detect whether a reagent vessel is correctly oriented or not.

The orientation sensor may be an optical sensor. Thus, the analytical instrument may detect whether a reagent vessel is correctly oriented or not by simple construction. The optical sensor may be adapted to identify the orientation of the reagent vessel by a field having at least one predetermined color arranged on the reagent vessel. Thus, the analytical instrument may detect whether a reagent vessel is correctly oriented or not in a reliable manner. The optical sensor may be adapted to identify the orientation of the reagent vessel by an orientation of a field divided into two different colors arranged on the reagent vessel. Thus, the analytical instrument may detect whether a reagent vessel is correctly oriented or not in a reliable and exact manner.

A loading device for loading a reagent rotor of an analytical instrument with reagent vessels can comprise a tray adapted to receive a plurality of reagent vessels. The tray can be movable within a first plane at least between a loading position, at which the tray can be loadable with the plurality of reagent vessels, and an unloading position, at which the plurality of reagent vessels can be unloadable from the tray. The loading device can also comprise a transporting device for transporting the plurality of reagent vessels from the tray to the reagent rotor of the analytical instrument. The tray can be formed such that the transporting device can be linearly moveable within a second plane from the unloading position of the tray to the reagent rotor and/or from the reagent rotor to the unloading position of the tray. The first plane and the second plane can be different from one another. The second plane can be substantially perpendicular to the first plane.

The tray can be formed as a circular ring segment. The tray can be moveable on a circular path. The circular path can define a middle point. The tray can comprise compartments for receiving the plurality of reagent vessels. The compartments can be arranged at even angular positions around the middle point of the circular path. The second plane can be spaced apart from the middle point of the circular path.

The tray can comprise compartments for receiving the plurality of reagent vessels. The compartments can be arranged in a row.

The transporting device can comprise a gripping device for gripping the reagent vessel. The gripping device can be arranged at a leading end of the transporting device.

The transporting device can comprise at least one piercing device for piercing the reagent vessel. The piercing device can be arranged so as to be moveable within the second plane. In one embodiment, the piercing device can comprise at least a first piercing needle for piercing the reagent vessel and for widening an opening generated by the first piercing needle.

In another embodiment, the piercing device can comprise a first piercing needle for piercing the reagent vessel and a second piercing needle for widening an opening generated by the first piercing needle. The second piercing needle can be arranged closer to the gripping device than the first piercing needle.

The piercing device can be integrally moveable with the transporting device. The piercing device can be arranged adjacent to the gripping device.

The loading device can further comprise at least one motor for moving the tray. The motor can be adapted to move the tray stepwise with predetermined steps. The predetermined step can comprise identical dimensions. A dimension of the predetermined steps can correspond to a distance between two adjacent reagent vessels.

The tray can comprise at least one groove. The motor can comprise at least one pin. The groove can be adapted to engage the pin.

The tray can comprise an assembly of evenly spaced apart grooves. The motor can be adapted to move the tray stepwise with the predetermined steps by engagement of the grooves and the pin.

The pin can be arranged on a crank or disc. The motor can be adapted to rotate the crank or disc.

The step motor can comprise two pins arranged opposite to one another having a middle point of the crank or disc therebetween. The grooves can be arranged at a lower side of the tray.

The motor can be arranged close to the second plane.

The motor can be arranged close to the unloading position of the tray.

The loading device can further comprise a plurality of motors for moving the tray. The motors can be synchronized. The motors can be synchronized by sensors. The motors can be mechanically coupled to one another. The motors can be coupled to one another a belt or a gear drive.

The loading device can be adapted to be arranged within the analytical instrument such that the first plane can be substantially parallel to the reagent rotor.

An analytical instrument can comprise a reagent rotor and a loading device as described.

The analytical instrument can further comprise a cooling device for cooling the plurality of reagent vessels. The cooling device can be arranged within a moving direction of the tray.

The tray can be moveable into a final position arranged after the unloading position if seen in a moving direction from the loading position to the unloading position. The cooling device can be arranged so as to house the plurality of reagent vessels at the final position of the tray.

The transporting device can comprise at least one piercing device. The analytical instrument can comprise at least one cleaning station for cleaning the piercing device. The cleaning station can be arranged at a moving path of the transporting device.

The reagent rotor can comprise a plurality of reagent rotor loading positions, at which the plurality of reagent vessels can be loadable onto the reagent rotor. The reagent rotor can be rotatable such that at least one of the reagent rotor loading positions is arranged within the second plane. The plurality of reagent rotor loading positions can be arranged so as to form groups of two reagent rotor loading positions adjacent to one another within a third plane. The reagent rotor can be rotatable such that at least the third plane can overlap the second plane.

The analytical instrument can further comprise a RFID sensor for identifying a RFID tag provided on the reagent vessel. The RFID sensor can be arranged within the moving path of the tray between the loading position and the unloading position.

The analytical instrument can further comprising an orientation sensor for detecting an orientation of the reagent vessel. The orientation sensor can be an optical sensor. In one embodiment, the optical sensor can be adapted to identify the orientation of the reagent vessel by a field having at least one predetermined color arranged on the reagent vessel. In another embodiment, the optical sensor can be adapted to identify the orientation of the reagent vessel by an orientation of a field divided into two different colors arranged on the reagent vessel.

Referring initially to FIG. 1, FIG. 1 shows an analytical instrument 100 according to the present disclosure. The analytical instrument 100 can comprise a reagent rotor 102 and a loading device 104. The loading device 104 can be adapted to load the reagent rotor 102 with reagent vessels 106. The loading device 120 can comprises a tray 108 adapted to receive a plurality of reagent vessels 106. The tray 108 can be formed as a circular ring segment. The tray 108 can comprise compartments 110 for receiving the plurality of reagent vessels 106. For example, the tray 108 can comprise five so as to receive five reagent vessels 106 compartments The tray 108 can be movable within a first plane 112 at least between a loading position 114, at which the tray 108 can be loadable with the plurality of reagent vessels 106, and an unloading position 116 (FIG. 2), at which the plurality of reagent vessels 106 can be unloadable from the tray 108. According to FIG. 1, the first plane 112 can be identical to the plane of projection. More particularly, the tray 108 can be moveable on a circular path 118. The circular path 118 can define a middle point 120. The compartments 110 can be arranged at even angular positions 122 around the middle point 120 of the circular path 118. More particularly, the compartments 110 can be arranged one after another at the even angular positions 122 around the middle point 120 of the circular path 118. In other words, the compartments 110 can be arranged in a single row on a circular path. Alternatively, the tray 108 may comprise a longitudinal shape such as a rectangular shape. In this case, the compartments 110 may be arranged in a longitudinal row.

Figure 2:
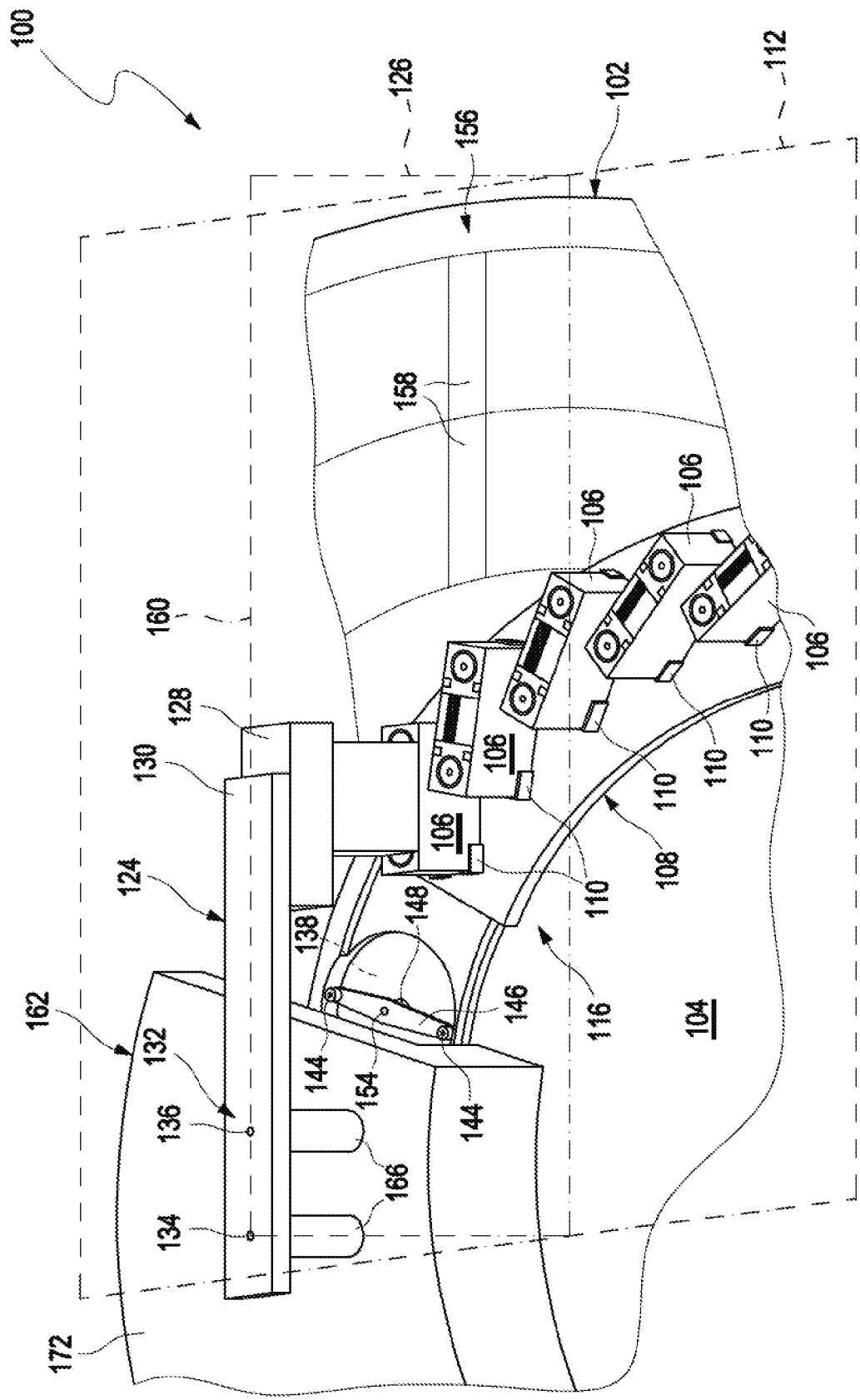
FIG. 2 illustrates the tray in the unloading position according to an embodiment of the present disclosure.

FIG. 2 shows the tray 108 in the unloading position 116. The loading device 104 can further comprise a transporting device 124 for transporting the plurality of reagent vessels 106 from the tray 108 to the reagent rotor 102 of the analytical instrument 100. As the tray 108 is formed as described manner, the transporting device 124 can be linearly moveable within a second plane 126 from the unloading position 116 of the tray 108 to the reagent rotor 102. In addition or alternatively, the transporting device 124 can be linearly moveable within the second plane 126 from the reagent rotor 102 to the unloading position 116 of the tray 108. It can be noted that the first plane 112 and the second plane 126 can be different from one another. Particularly, the second plane 126 can be substantially perpendicular to the first plane 112. The second plane 126 can be oriented so as to be spaced apart from the middle point 120 of the circular path 118. In other words, the middle point 120 of the circular path 118 may not be located within the second plane 126.

The transporting device 124 can comprise a gripping device 128 adapted to grip one of the reagent vessels 106. The gripping device 128 can be arranged at a leading end 130 of the transporting device 124. The transporting device 124 can further comprise at least one piercing device 132 for piercing one of the reagent vessels 106. The piercing device 132 can be arranged adjacent to the gripping device. 128. For example, the piercing device 132 can be arranged at a rear end of the transporting device 124. The piercing device 132 can be arranged so as to be moveable within the second plane 126. Particularly, the piercing device 132 can be integrally moveable with the transporting device 124. Preferably, the piercing device 132 can comprise a first piercing needle 134 adapted to pierce the reagent vessel 106 and to wide an opening already generated by the piercing process of the first piercing needle 134. In further embodiment, the piercing device 132 can comprise the first piercing needle 134 for piercing the reagent vessel 106 and a second piercing needle 136 for widening the opening generated by the first piercing needle 134. In the latter embodiment, the second piercing needle 136 can be arranged closer to the gripping device 128 than the first piercing needle 134.

Figure 3:
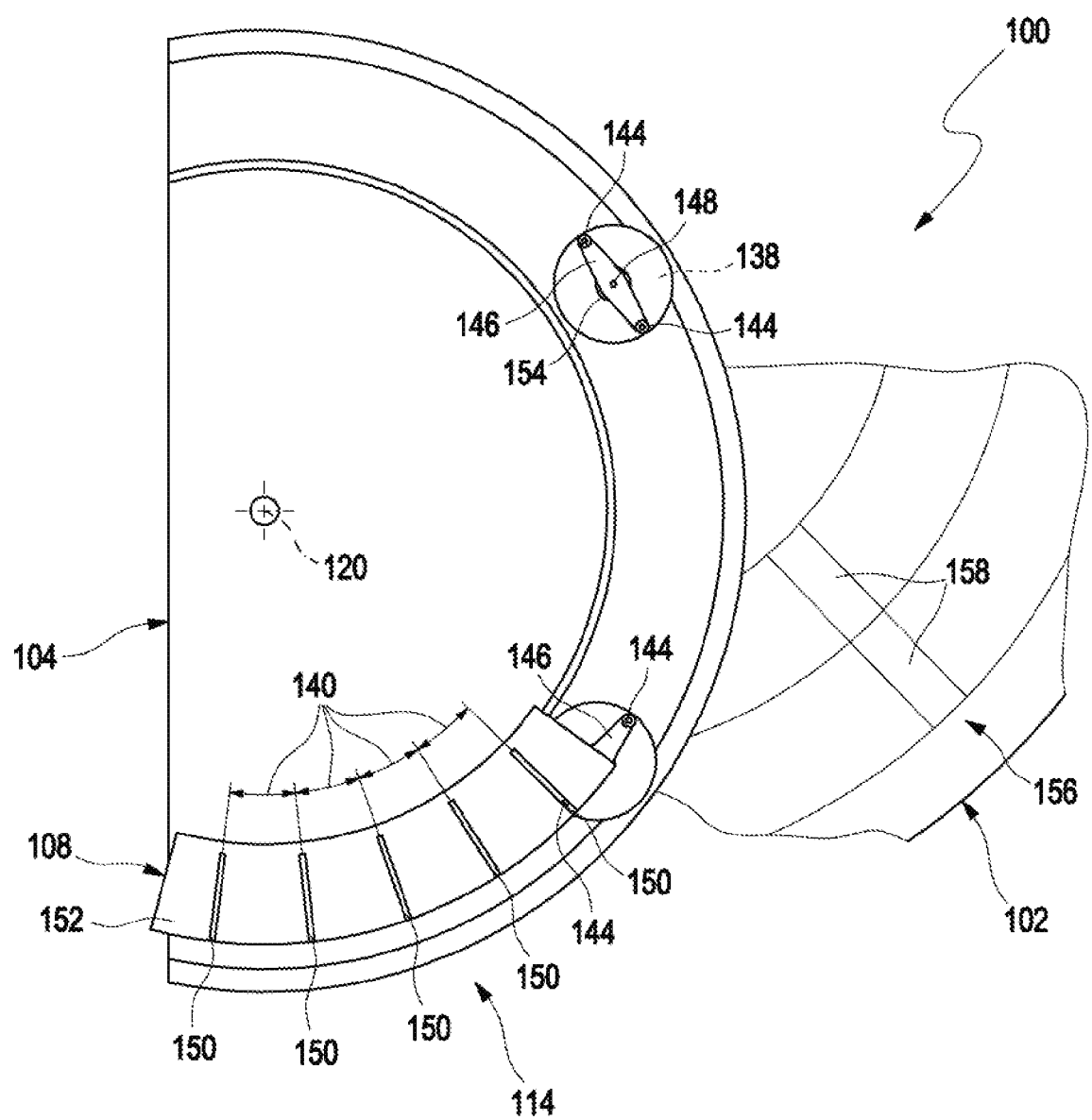
FIG. 3 illustrates the analytical instrument with the tray being partly removed according to an embodiment of the present disclosure.

FIG. 3 shows the analytical instrument 100 with the tray 108 partly removed. The loading device 104 can further comprise at least one motor 138 for moving the tray. The motor 138 can be arranged close to the second plane 126. Further, the motor 138 can be arranged close to the unloading position 116 of the tray 108. Particularly, the motor 138 can be adapted to move the tray 108 stepwise with predetermined steps. The predetermined steps can comprise identical dimensions 140. In other words, all predetermined steps can be of equal size. Particularly, a dimension 140, or length, of the predetermined steps can correspond to a distance 142 between two adjacent reagent vessels 106. The motor 138 can comprise at least one pin 144. The pin 144 can be arranged on a crank 146. Alternatively, the pin 144 may be arranged on a disc. The crank 146 can be adapted to be rotated by the motor 138. In other words, the motor 138 can be adapted to rotate the crank 146. According to the present embodiment, the motor 138 can comprise two pins 144 arranged opposite to one another having a middle point 148 of the crank 146 therebetween. In other words, the two pins 144 can be spaced apart from one another at about 180° with respect to a circumference of the crank 146. The pins 144 can be arranged at an outer edge of the crank 146. Thus, a distance of the pins 144 to the middle point 148 of the crank 146 can correspond approximately to a radius of the crank 146. The tray 108 can comprise at least one groove 150. According to the present embodiment, the tray 108 can comprise an assembly or plurality of evenly spaced apart grooves 150. The grooves 150 can be arranged at a lower side 152 of the tray 108. Each of the grooves 150 can comprise a length corresponding to at least the radius of the crank 146. Each of the grooves 150 can be adapted to engage the pin 144. The motor 138 can be adapted to move the tray 108 stepwise with the predetermined steps by engagement of the grooves 150 and the pin 144. The grooves 150 may comprise an entrance orifice (not shown in detail) allowing the pin 144 to enter the groove 150. The entrance orifice may be tapered in a direction facing away from the middle point 148 of the crank 146 so as to facilitate the engagement of the groove and the pin 144. According to the present embodiment, a single motor 138 can be present and arranged below the tray 108. Further, two cranks 146 can be present, each of which can have two pins 144 arranged in the above manner. One of the cranks 146 can be directly connected to the motor 138. More particularly, one of the cranks 146 can be connected to an output shaft 154 of the motor 138. The other one of the cranks 146 can be indirectly connected to the motor 138. More particularly, the other crank 146 can be mechanically coupled to that crank 146, which can be directly connected to the motor 138, by a belt (not shown in detail). Thus, both cranks 146 can be synchronized by the belt such that a driving operation of the motor 138 can synchronously rotate both cranks 146 at the same speed.

According to an alternative embodiment, the loading device 104 can comprise a plurality of motors 138 for moving the tray 108. In this case, the motors 138 can be synchronized. For example, the motors 138 can be synchronized by sensors. Alternatively, the motors 138 can be mechanically coupled to one another. For example, the motors 138 can be coupled to one another by a belt or a gear drive. According to the above construction of the loading device 104, the loading device 104 can be adapted to be arranged within the analytical instrument 100 such that the first plane 112 can be substantially parallel to the reagent rotor 102.

The reagent rotor 102 can comprise a plurality of reagent rotor loading positions 156, at which the plurality of reagent vessels 106 can be loadable onto the reagent rotor 102. The plurality of reagent rotor loading positions 156 can be arranged so as to form groups 158 of two reagent rotor loading positions adjacent to one another within a third plane 160. The third plane 160 can be oriented substantially perpendicular to the reagent rotor 102. The reagent rotor 102 can be rotatable such that at least one of the reagent rotor loading positions 156 can be arranged within the second plane 126. In other words, the reagent rotor 102 may be rotated such that at least one of the reagent rotor loading positions 156 can be moved so as to be located within the second plane 126. Particularly, the reagent rotor 102 can be rotatable such that at least the third plane 160 can overlap the second plane 126.

The analytical instrument 100 can further comprise a cooling device 162 for cooling at least one and preferably all of the plurality of reagent vessels 106. The cooling device 162 can be arranged within a moving direction of the tray 108. Particularly, the tray 108 can be moveable into a final position 164 arranged behind the unloading position 116 if seen in a moving direction from the loading position 114 to the unloading position 116. The cooling device 162 can be arranged so as to house the plurality of reagent vessels 106 at the final position 164 of the tray 108. Thus, any reagent vessels 106 not used during an analytical operation of the analytical instrument 100 may be stored within the cooling device 162 at least for some time in order to prevent any deterioration or variation of the characteristics of the liquid in the reagent vessel 106.

The analytical instrument 100 can further comprise at least one cleaning station 166 for cleaning the piercing device 132. More particularly, the cleaning station 166 can be adapted to clean the first piercing needle 134. Needless to say, in case the piercing device 132 comprises the second piercing needle 136, the cleaning station 166 can also be adapted to clean the second piercing needle 136. The cleaning station 166 can be arranged at a moving path of the transporting device 124. Thus, by movement of the transporting device 124, the piercing device 132 may be cleaned without any need for the transporting device 124 to leave the second plane 126.

The analytical instrument 100 may further comprise some optional features as will be explained below. Particularly, the analytical instrument may comprise a RFID sensor for identifying a RFID tag provided on a reagent vessel 106. Preferably, the RFID sensor can be arranged within the moving path of the tray 108 between the loading position 114 and the unloading position 116. Thus, the analytical instrument 100 can be adapted to read information stored within the RFID tag by the RFID sensor. The information can include information about characteristics of the reagent vessel 106 and the content thereof, respectively, such as the kind of liquid in the reagent vessel 106, the amount of liquid in the reagent vessel 106, the concentration of the liquid in the reagent vessel 106 and the like. The analytical instrument may further comprise an orientation sensor 168 (FIG. 17) for detecting an orientation of the reagent vessel 106. This can be particularly important as the reagent vessel 106 may contain more than one liquid and it may be of significant importance to use the liquids in an analytical process in the correct order. As the correct orientation may not be detected by the RFID sensor and the RFID tag, the analytical instrument 100 can be provided with the orientation sensor 168. The orientation sensor 168 may be an optical sensor. Particularly, the optical sensor can be adapted to identify the orientation of the reagent vessel 106 by a field having at least one predetermined color arranged on the reagent vessel 106. More particularly, the optical sensor can be adapted to identify the orientation of the reagent vessel 106 by an orientation of a field 170 divided into two different colors arranged on the reagent vessel 106. For example, the field 170 may be formed as an orientation identification label comprising an optically detectable definition pattern defining an orientation of the label on the reagent vessel 106. The optically detectable definition pattern may comprise at least two different colors allowing identification of an orientation. In the context of this application, the term "colors" can be understood to also comprise black, white and grey. Thus, the optically detectable pattern may be a label consisting of two adjacent rectangles, one of the rectangles been white and the other of the rectangles being black. However, other color combinations and/or combinations of more than two colors might be used. Regarding details on an optional RFID sensor and an orientation sensor, EP 2 020 263 A1 describes reagent vessels which may be used with the analytical instrument and is hereby incorporated by reference. Additionally, the construction of the RFID sensor, the orientation sensor and the operation thereof as described in EP 2 020 263 A1 is also hereby incorporated by reference.

The operation of the analytical instrument 100 will be now described. At the beginning, the loading device 104 can be operated such that the tray 108 either can already be in the loading position 114 or can be moved into the loading position 114. FIG. 1 shows the tray 108 in the loading position. Then, the reagent vessels 106 can be loaded into the compartments 110 of the tray 108. Needless to say, one reagent vessel 106 can be loaded into one respective compartment 110. The reagent vessels 106 may all be loaded into the compartments 110 if the analytical instrument 100 comprises a sufficient large opening or may be loaded in a subsequent order into the compartments 110. In the latter case, the tray 108 may be moved a step further after a reagent vessel 106 has been loaded into a respective compartment 110. Subsequently, the tray 108 can be moved into the unloading position 116 by the motor 138.

FIG. 2 shows the tray 108 in the unloading position 116. More particularly, the tray 108 can be moved such that a first one of the reagent vessels 106 if seen in a moving direction of the tray 108 can be positioned in the unloading position 116. Then, the transporting device 124 can be moved such that the gripping device 128 can be positioned above the first one of the reagent vessels 106. For example, the transporting device 124 can be moved in a horizontal, or lateral, direction. Subsequently, the transporting device 124 can be moved such that the gripping device 128 can grip the first one of the reagent vessels 106. For example, the transporting device 124 can be moved in a vertical direction downwards. When the gripping device 128 has gripped the first one of the reagent vessels 106, the transporting device 124 can be moved such that the first one of the reagent vessels 106 can be transferred to the reagent rotor 102. For example, the transporting device 124 can be moved first in the vertical direction upwards, secondly in the horizontal, or lateral, direction and finally in the vertical direction downwards as shown in FIG. 4.

Figure 4:
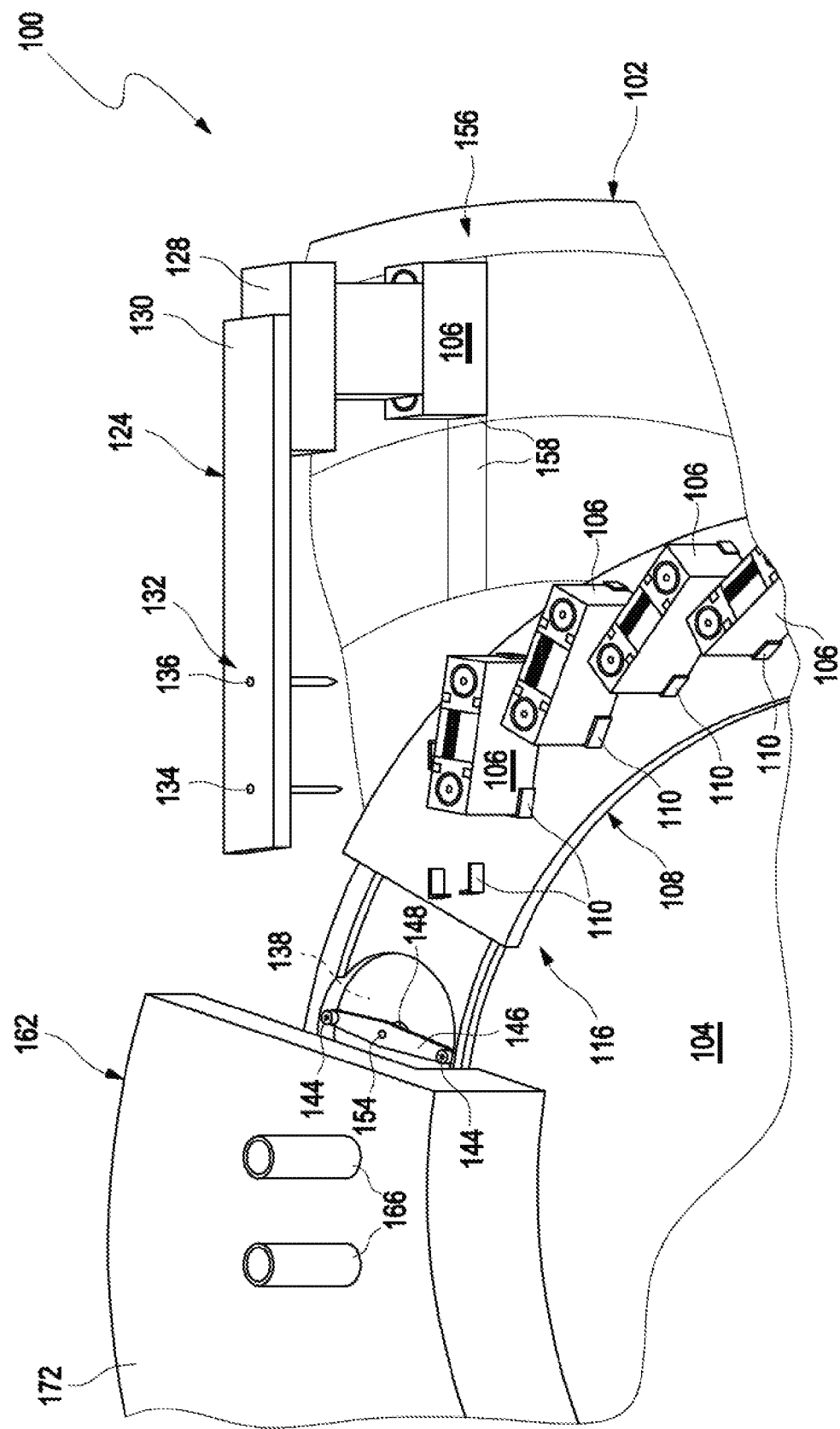
FIG. 4 illustrates the tray in the unloading position and the first one of the reagent vessels transferred to the reagent rotor according to an embodiment of the present disclosure.

FIG. 4 shows the tray 108 in the unloading position 116 and the first one of the reagent vessels 106 transferred to the reagent rotor 102. The first one of the reagent vessels 106 can be positioned on the reagent rotor 102, for example at an outer one of the reagent rotor loading positions 156. The gripping device 128 can then release the first one of the reagent vessels 106. The tray 108 can then be moved a predetermined step further by the motor 138 such that the second one of the reagent vessels 106 if seen in a moving direction of the tray 108 can be positioned in the unloading position 116. Particularly, a movement of the tray 108 one predetermined step further can be realized in that the motor 138 can rotate the cranks 146 at a half rotation or about 180°. A first one of the pins 144 can exit a first one of the grooves 150 and a second one of the pins 144 can engage a second one of the grooves 150 adjacent the first one of the grooves 150. Further, the transporting device 124 can be moved such that the gripping device 128 can be positioned above the second one of the reagent vessels 106 as shown in FIG. 5.

Figure 5:
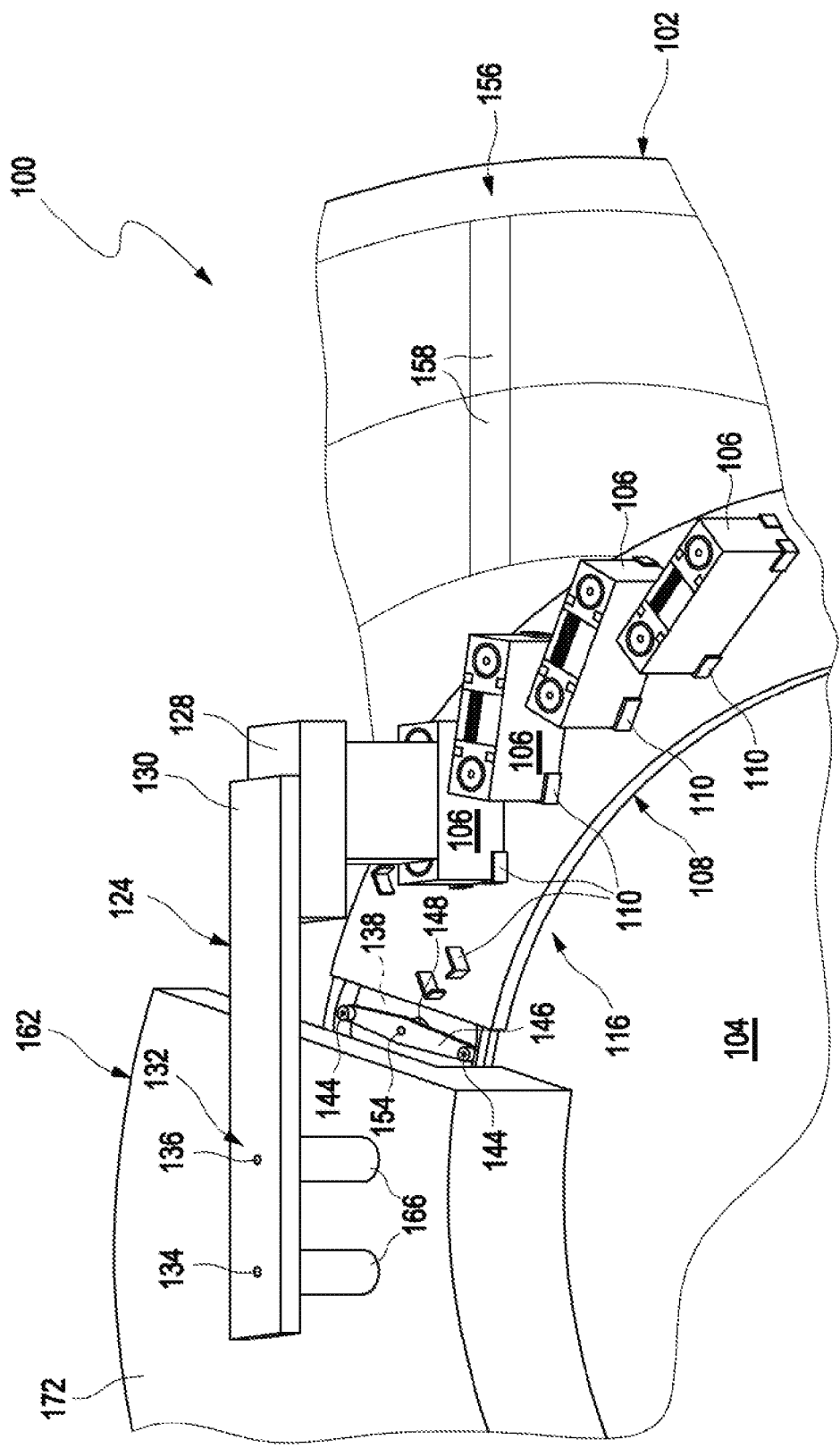
FIG. 5 illustrates the tray with the second one of the reagent vessels in the unloading position according to an embodiment of the present disclosure.

FIG. 5 shows the tray 108 with the second one of the reagent vessels 106 in the unloading position 116. The transporting device 124 can be moved such that the gripping device 128 can grip the second one of the reagent vessels 106. For example, the transporting device 124 can be moved in the vertical direction downwards. When the gripping device 128 has gripped the second one of the reagent vessels 106, the transporting device 124 can be moved such that the second one of the reagent vessels 106 can be transferred to the reagent rotor 102. For example, the transporting device 124 can be moved first in the vertical direction upwards, secondly in the horizontal, or lateral, direction and finally in the vertical direction downwards as shown in FIG. 6.

Figure 6:
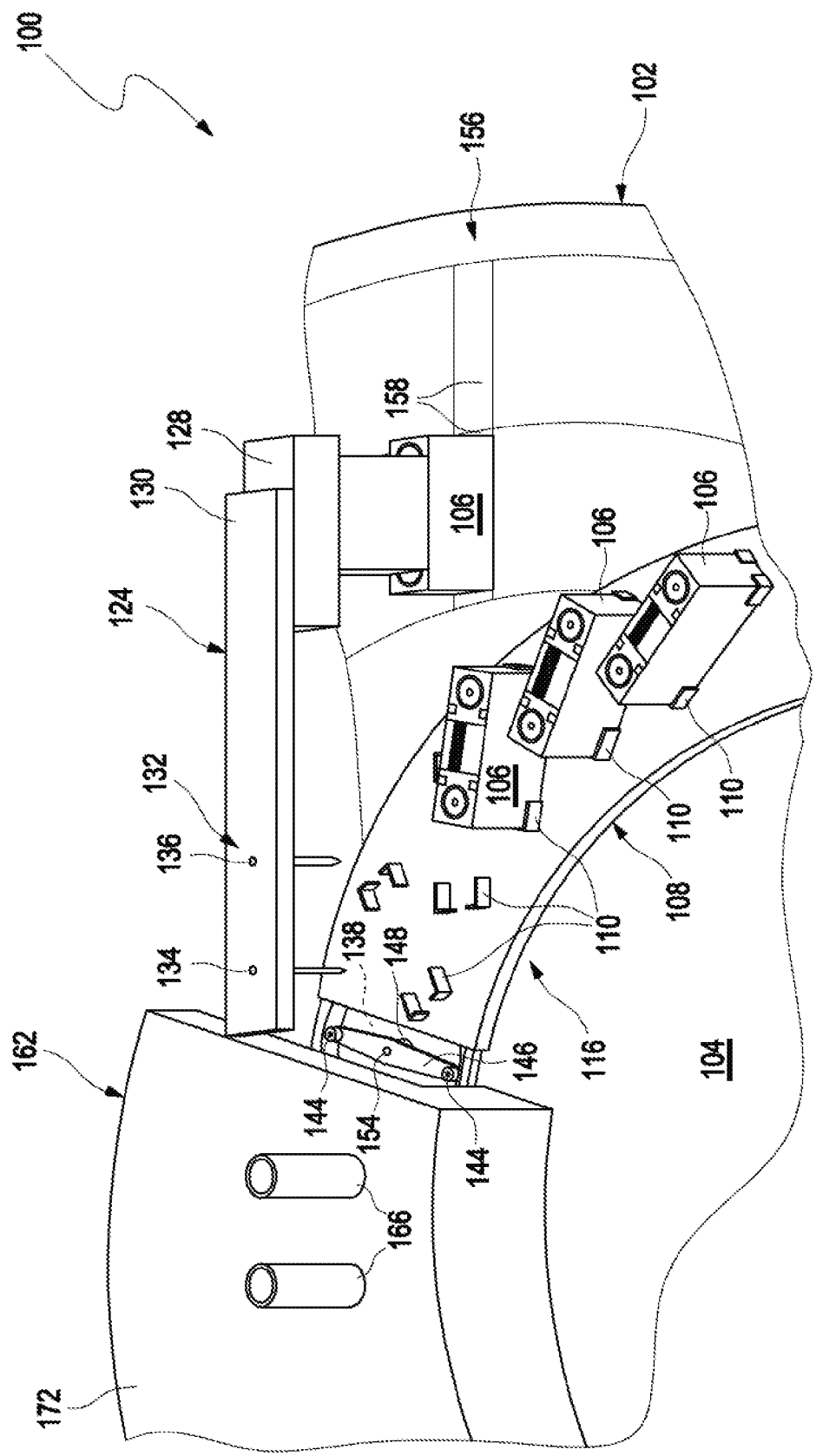
FIG. 6 illustrates the tray in the unloading position and the second one of the reagent vessels transferred to the reagent rotor according to an embodiment of the present disclosure.

FIG. 6 shows the tray 108 in the unloading position 116 and the second one of the reagent vessels 106 transferred to the reagent rotor 102. The second one of the reagent vessels 106 can be positioned on the reagent rotor 102, for example at an inner one of the reagent rotor loading positions 156. For reasons of simplification, the first one of the reagent vessels 106 is not shown on the reagent rotor 102. The gripping device 128 can then release the second one of the reagent vessels 106. The tray 108 can then be moved a predetermined step further by the motor 138 such that the third one of the reagent vessels 106 if seen in a moving direction of the tray 108 can be positioned in the unloading position 116. Particularly, a movement of the tray 108 one predetermined step further can be realized in that the motor 138 can rotate the cranks 146 at a half rotation, or about 180°, in the above-described manner, wherein the second one of the pins 144 can exit the second one of the grooves 150 and the first one of the pins 144 can engage a third one of the grooves 150 adjacent the second one of the grooves 150. Further, the transporting device 124 can be moved such that the gripping device 128 can be positioned above the third one of the reagent vessels 106 as shown in FIG. 7.

Figure 7:
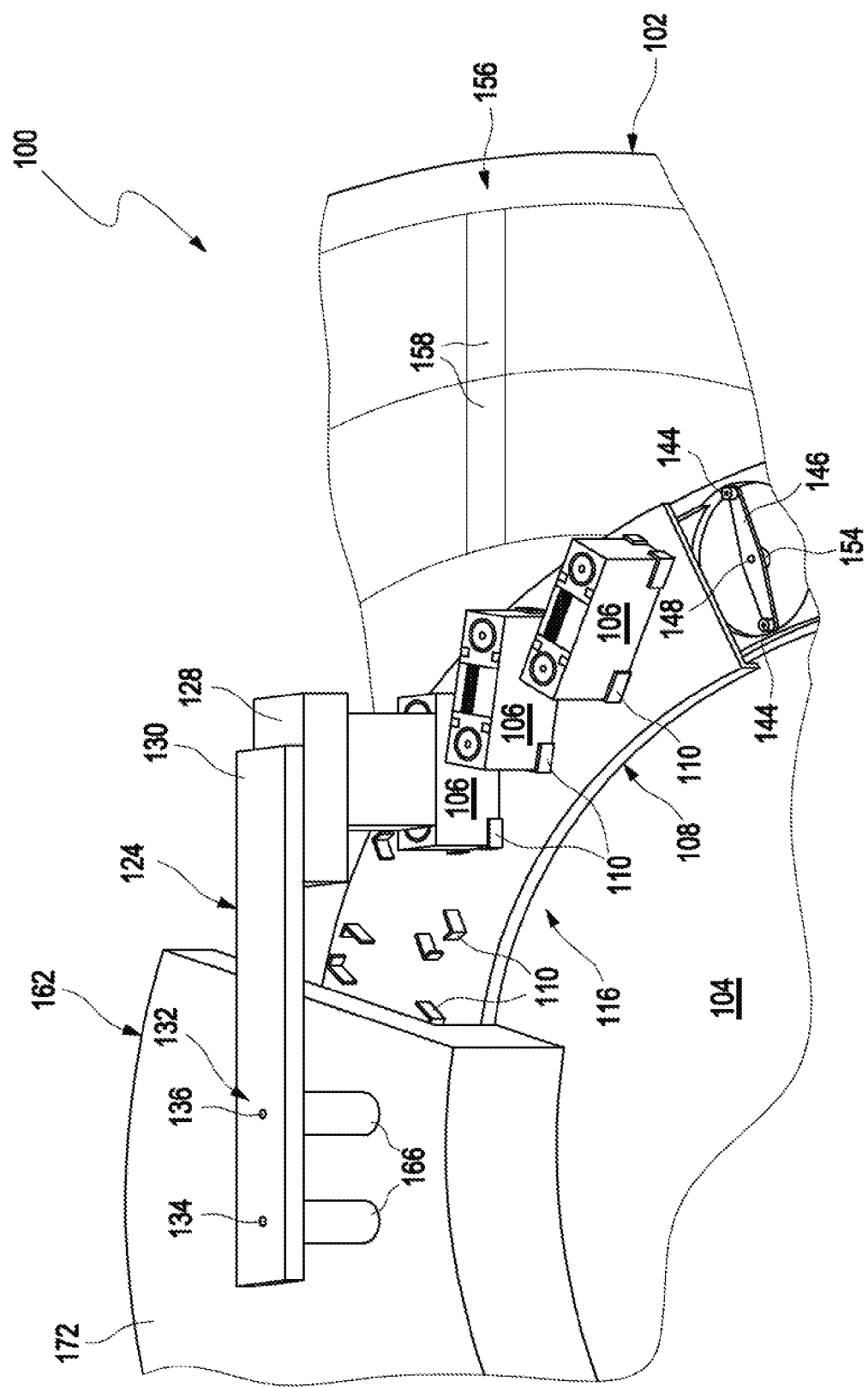
FIG. 7 illustrates the tray with the third one of the reagent vessels in the unloading position according to an embodiment of the present disclosure.

FIG. 7 shows the tray 108 with the third one of the reagent vessels 106 in the unloading position 116. The transporting device 124 can be moved such that the gripping device 128 can grip the third one of the reagent vessels 106. For example, the transporting device 124 can be moved in the vertical direction downwards. The reagent rotor 102 can be rotated to a further reagent rotor loading position 156. When the gripping device 128 has gripped the third one of the reagent vessels 106 and the reagent rotor 102 has rotated to the further reagent rotor loading position 156, the transporting device 124 can be moved such that the third one of the reagent vessels 106 can be transferred to the reagent rotor 102. For example, the transporting device 124 can be moved first in the vertical direction upwards, secondly in the horizontal, or lateral, direction and finally in the vertical direction downwards as shown in FIG. 8.

Figure 8:
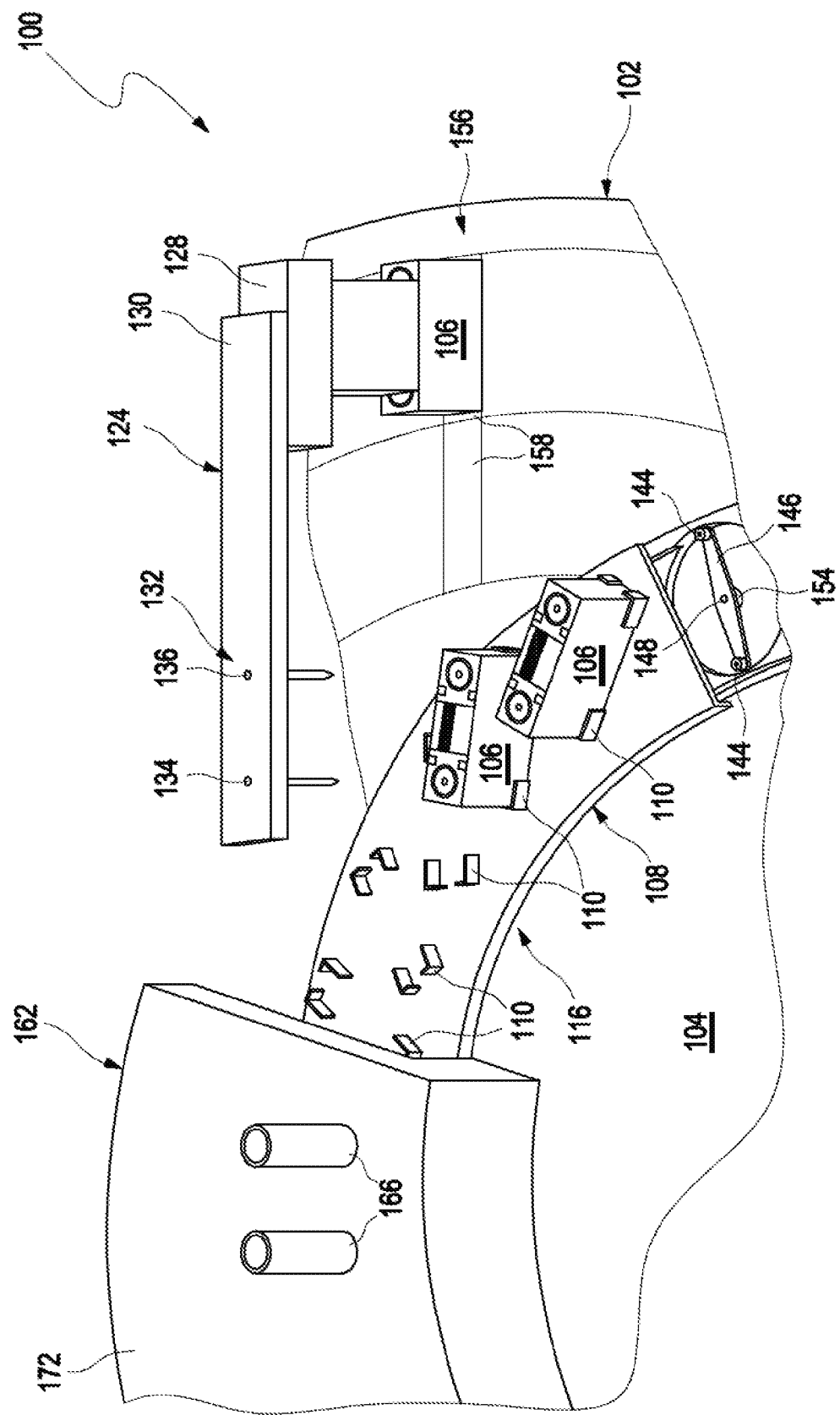
FIG. 8 illustrates the tray in the unloading position and the third one of the reagent vessels transferred to the reagent rotor according to an embodiment of the present disclosure.

FIG. 8 shows the tray 108 in the unloading position 116 and the third one of the reagent vessels 106 transferred to the reagent rotor 102. The third one of the reagent vessels 106 can be positioned on the reagent rotor 102, for example at an outer one of the reagent rotor loading positions 156. The gripping device 128 can then release the third one of the reagent vessels 106. The tray 108 can then be moved a predetermined step further by the motor 138 such that the fourth one of the reagent vessels 106 if seen in a moving direction of the tray 108 can be positioned in the unloading position 116. Particularly, a movement of the tray 108 one predetermined step further can be realized in that the motor 138 can rotate the cranks 146 at a half rotation, or 180°, in the above-described manner, wherein the first one of the pins 144 can exit the third one of the grooves 150 and the second one of the pins 144 can engage a fourth one of the grooves 150 adjacent the third one of the grooves 150. Further, the transporting device 124 can be moved such that the gripping device 128 can be positioned above the fourth one of the reagent vessels 106 as shown in FIG. 9.

Figure 9:
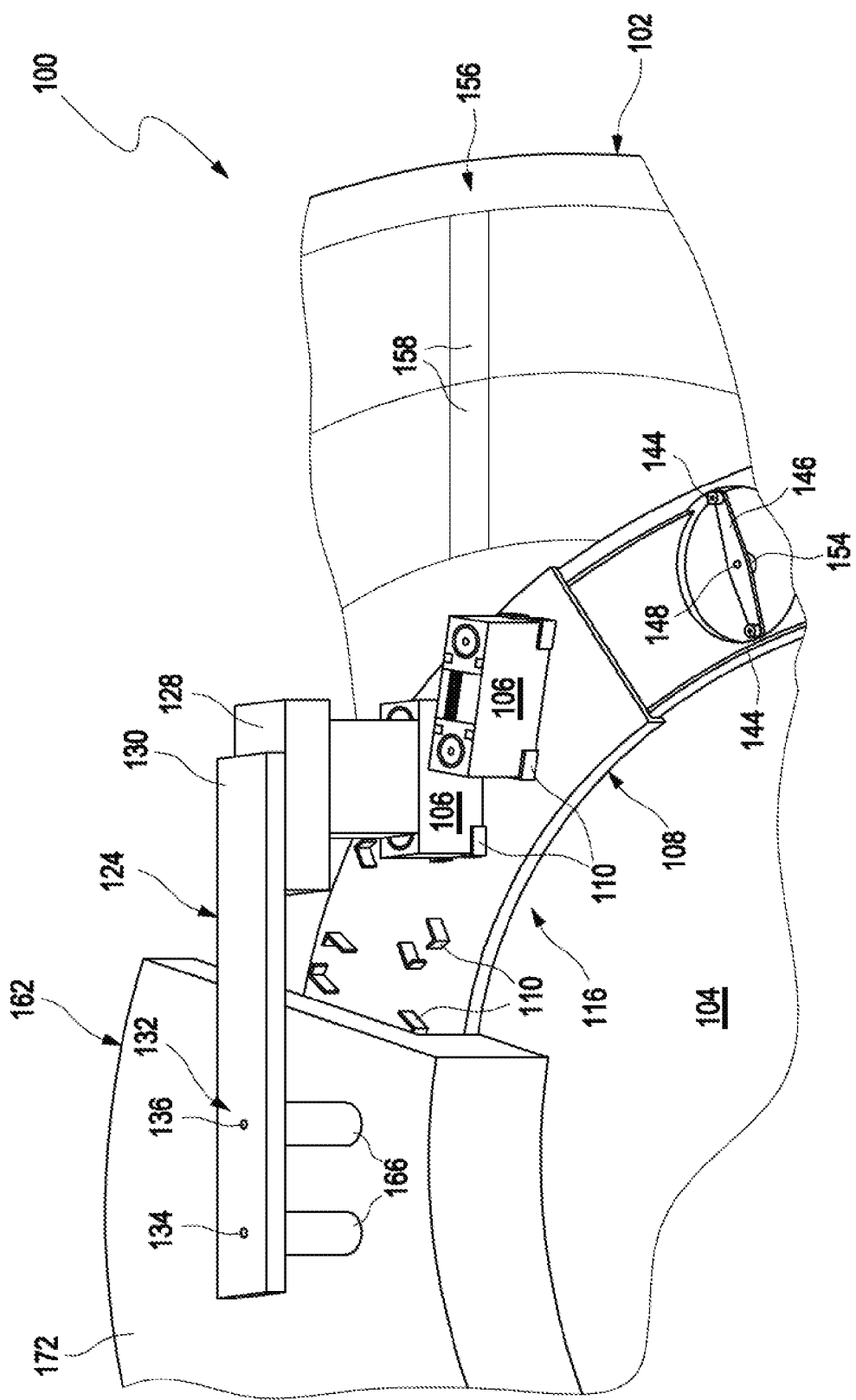
FIG. 9 illustrates the tray with the fourth one of the reagent vessels in the unloading position according to an embodiment of the present disclosure.

FIG. 9 shows the tray 108 with the fourth one of the reagent vessels 106 in the unloading position 116. The transporting device 124 can be moved such that the gripping device 128 can grip the fourth one of the reagent vessels 106. For example, the transporting device 124 can be moved in the vertical direction downwards. The reagent rotor 102 may be rotated to a further reagent rotor loading position 156. When the gripping device 128 has gripped the fourth one of the reagent vessels 106 and, optionally, the reagent rotor 102 has rotated to the further reagent rotor loading position 156, the transporting device 124 can be moved such that the fourth one of the reagent vessels 106 can be transferred to the reagent rotor 102. For example, the transporting device 124 can be moved first in the vertical direction upwards, secondly in the horizontal, or lateral, direction and finally in the vertical direction downwards as shown in FIG. 10.

Figure 10:
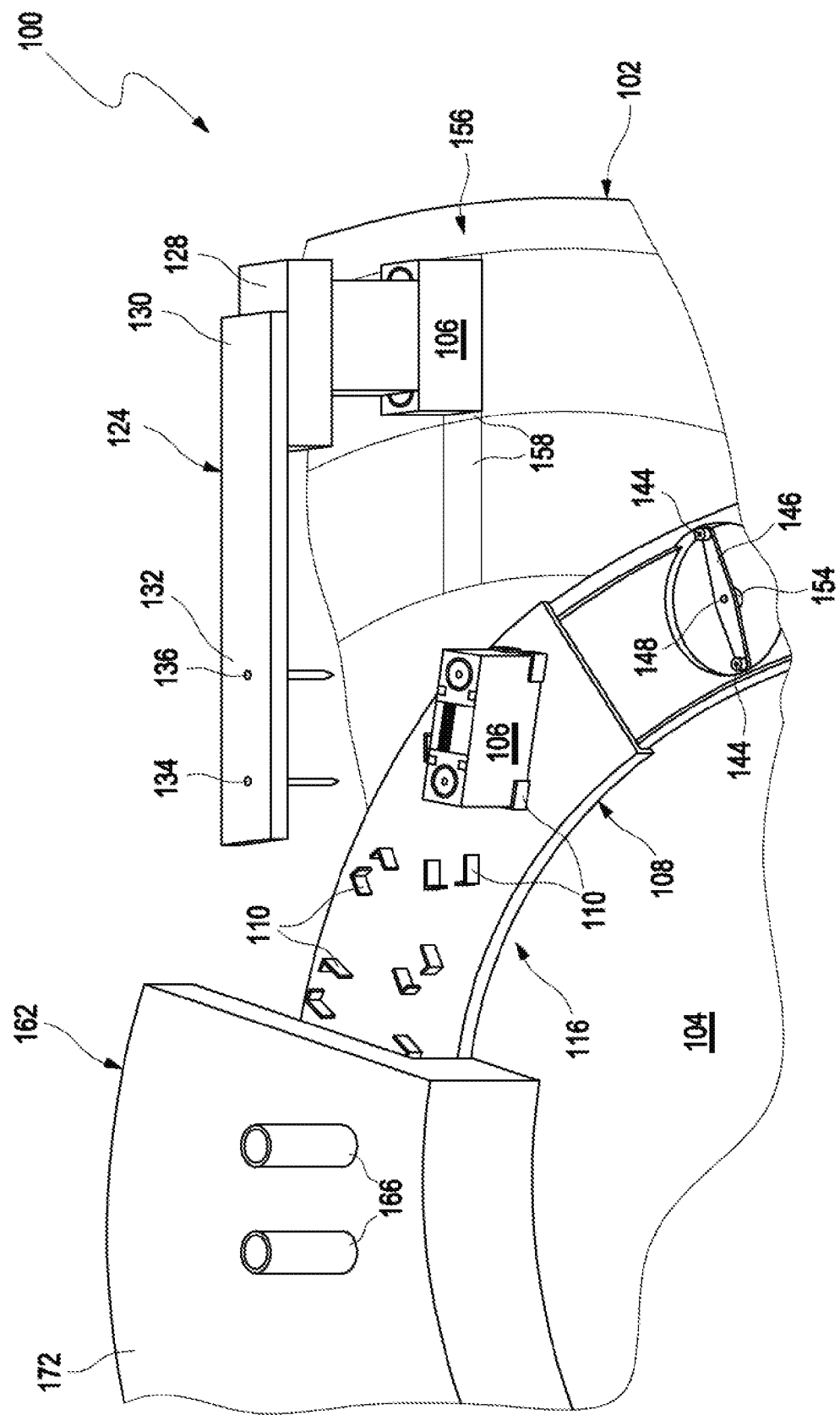
FIG. 10 illustrates the tray in the unloading position and the fourth one of the reagent vessels transferred to the reagent rotor according to an embodiment of the present disclosure.

FIG. 10 shows the tray 108 in the unloading position 116 and the fourth one of the reagent vessels 106 transferred to the reagent rotor 102. The fourth one of the reagent vessels 106 can be positioned on the reagent rotor 102, for example at an outer one of the reagent rotor loading positions 156. Needless to say, the fourth one of the reagent vessels 106 may be positioned on the reagent rotor 102 at an inner one of the reagent rotor loading positions 156 if the reagent rotor 102 is not rotated before the transfer of the fourth one of the reagent vessels 106 to the reagent rotor 102. The gripping device 128 can then release the fourth one of the reagent vessels 106. The tray 108 can then be moved a predetermined step further by the motor 138 such that the fifth one of the reagent vessels 106 if seen in a moving direction of the tray 108 can be positioned in the unloading position 116. Particularly, a movement of the tray 108 one predetermined step further can be realized in that the motor 138 can rotate the cranks 146 at a half rotation, or 180°, in the above-described manner, wherein the second one of the pins 144 can exit the fourth one of the grooves 150 and the first one of the pins 144 can engage a fifth one of the grooves 150 adjacent the fourth one of the grooves 150. Further, the transporting device 124 can be moved such that the gripping device 128 can be positioned above the fifth one of the reagent vessels 106 as shown in FIG. 11.

Figure 11:
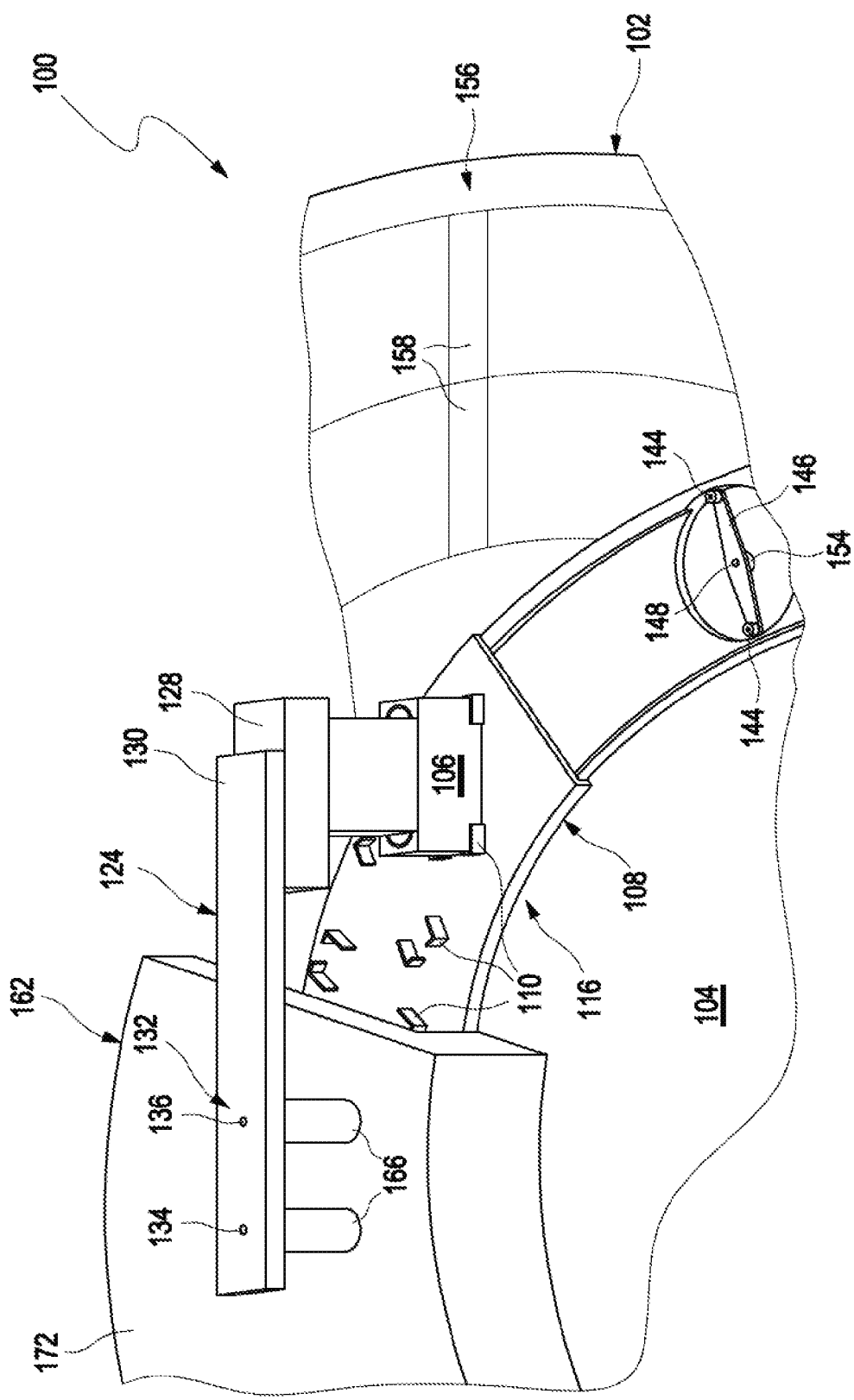
FIG. 11 illustrates the tray with the fifth one of the reagent vessels in the unloading position according to an embodiment of the present disclosure.

FIG. 11 shows the tray 108 with the fifth one of the reagent vessels 106 in the unloading position 116. The transporting device 124 can be moved such that the gripping device 128 can grip the fifth one of the reagent vessels 106. For example, the transporting device 124 can be moved in the vertical direction downwards. The reagent rotor 102 may be rotated to a further reagent rotor loading position 156. When the gripping device 128 has gripped the fifth one of the reagent vessels 106 and, optionally, the reagent rotor 102 has rotated to the further reagent rotor loading position 156, the transporting device 124 can be moved such that the fifth one of the reagent vessels 106 can be transferred to the reagent rotor 102. For example, the transporting device 124 can be moved first in the vertical direction upwards, secondly in the horizontal, or lateral, direction and finally in the vertical direction downwards as shown in FIG. 12.

Figure 12:
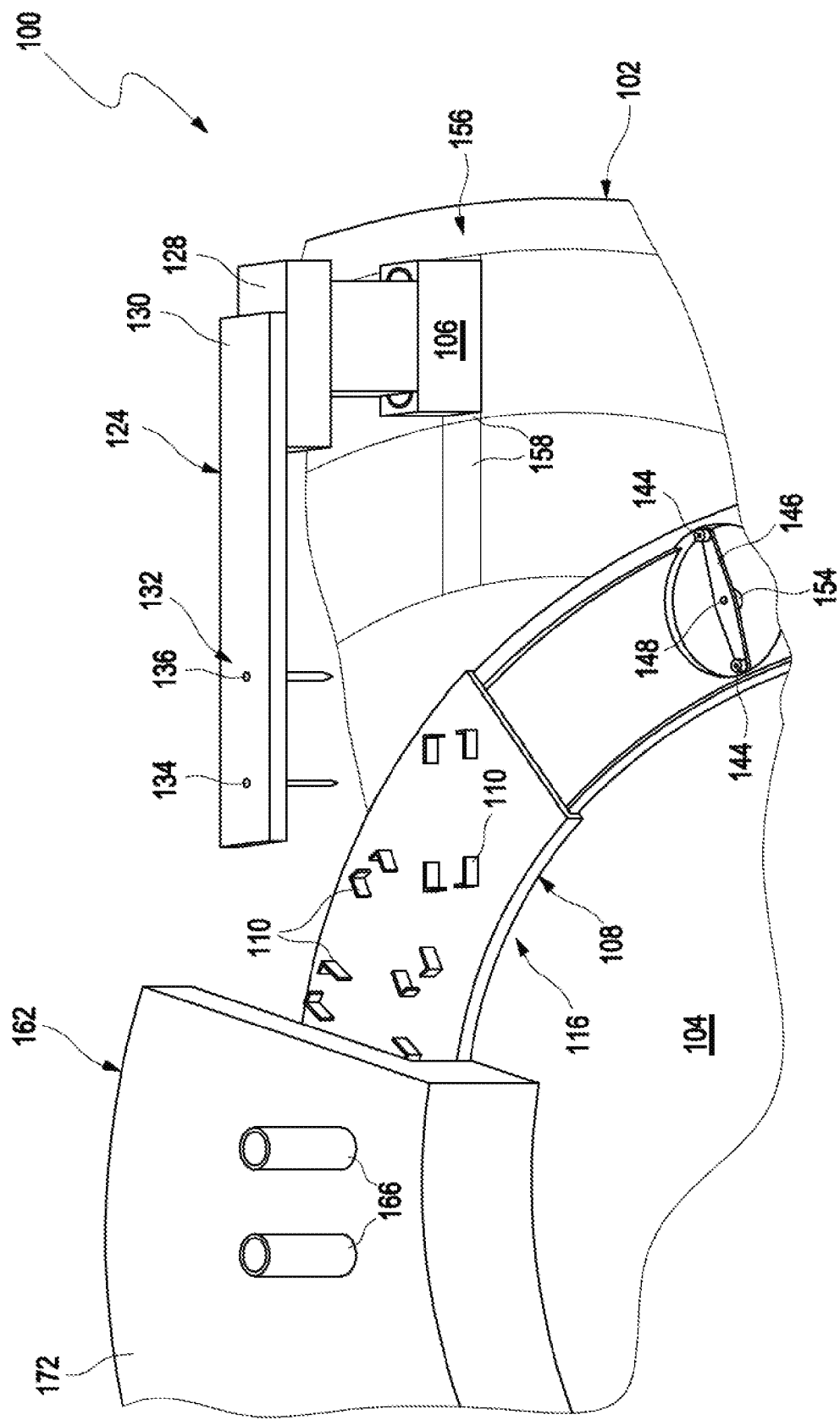
FIG. 12 illustrates the tray in the unloading position and the fifth one of the reagent vessels transferred to the reagent rotor according to an embodiment of the present disclosure.

FIG. 12 shows the tray 108 in the unloading position 116 and the fifth one of the reagent vessels 106 transferred to the reagent rotor 102. The fifth one of the reagent vessels 106 can be positioned on the reagent rotor 102, for example, at an outer one of the reagent rotor loading positions 156. Needless to say, the fifth one of the reagent vessels 106 may be positioned on the reagent rotor 102 at an inner one of the reagent rotor loading positions 156 if the reagent rotor 102 is not rotated before the transfer of the fifth one of the reagent vessels 106 to the reagent rotor 102. The gripping device 128 can then release the fifth one of the reagent vessels 106. The reagent vessels 106 may then be transported by the reagent rotor 102 to a position of further handling of the analytical instrument 100 such as pipetting position where a pipette probe of a pipettor of the analytical instrument 100 can suck the liquid from the reagent vessels 106. In order to allow the pipette probe to suck the liquid from the reagent vessels 106, it can be necessary to provide the reagent vessels 106 with suitable openings allowing the pipette probe to enter the interior of the reagent vessel 106. For this purpose, the loading device 104 can comprise the piercing device 132. Hereinafter, an operation of the piercing device 132 provided at the transporting device 124 will be explained.

The operation of the piercing device 132 provided at the transporting device 124 will be explained exemplarily with respect to a single reagent vessel 106. The reagent vessel 106 can be transported into the unloading position 116 of the tray. Before being transported to the reagent rotor 102, the reagent vessel 106 can be pierced by the piercing device 132. For example, the transporting device 124 can be moved such that the piercing device 132 can be positioned above the reagent vessel 106. Then, the transporting device 124 can be lowered, or moved, in the vertical direction downwards such that the first piercing needle 134 can pierce the reagent vessel 106. Thus, the first piercing needle 134 can generate an opening at the reagent vessel 106.

Figure 13:
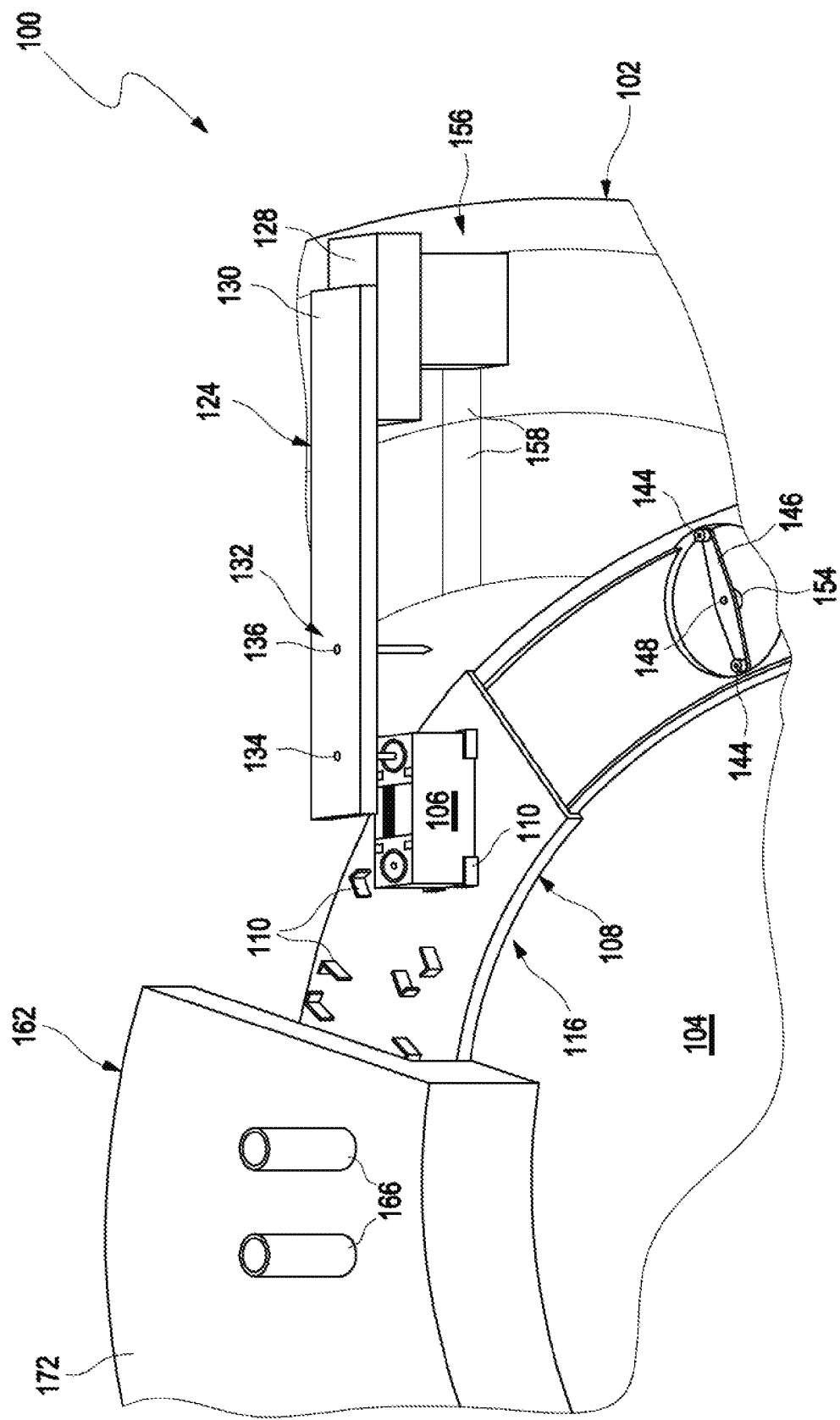
FIG. 13 illustrates the first piercing needle inserted into the reagent vessel during a first piercing process according to an embodiment of the present disclosure.

FIG. 13 shows the first piercing needle 134 inserted into the reagent vessel 106 during a first piercing process. As can be taken from FIG. 13, the first piercing needle 134 can pierce the reagent vessel first at an outer position facing the reagent rotor 102. In case the piercing device 132 comprises only the first piercing needle 134, the first piercing needle 134 may also be used for widening the opening. For example, if the first piercing needle 134 comprises a portion having a larger diameter than the tip of the first piercing needle 134, the opening may be widened when this portion is inserted into the reagent vessel 106. Subsequently, the transporting device 124 may be raised or moved in the vertical direction upwards, moved in the lateral or horizontal direction and then moved in the vertical direction downwards such that the first piercing needle 134 pierces the reagent vessel 106 at another position.

Figure 14:
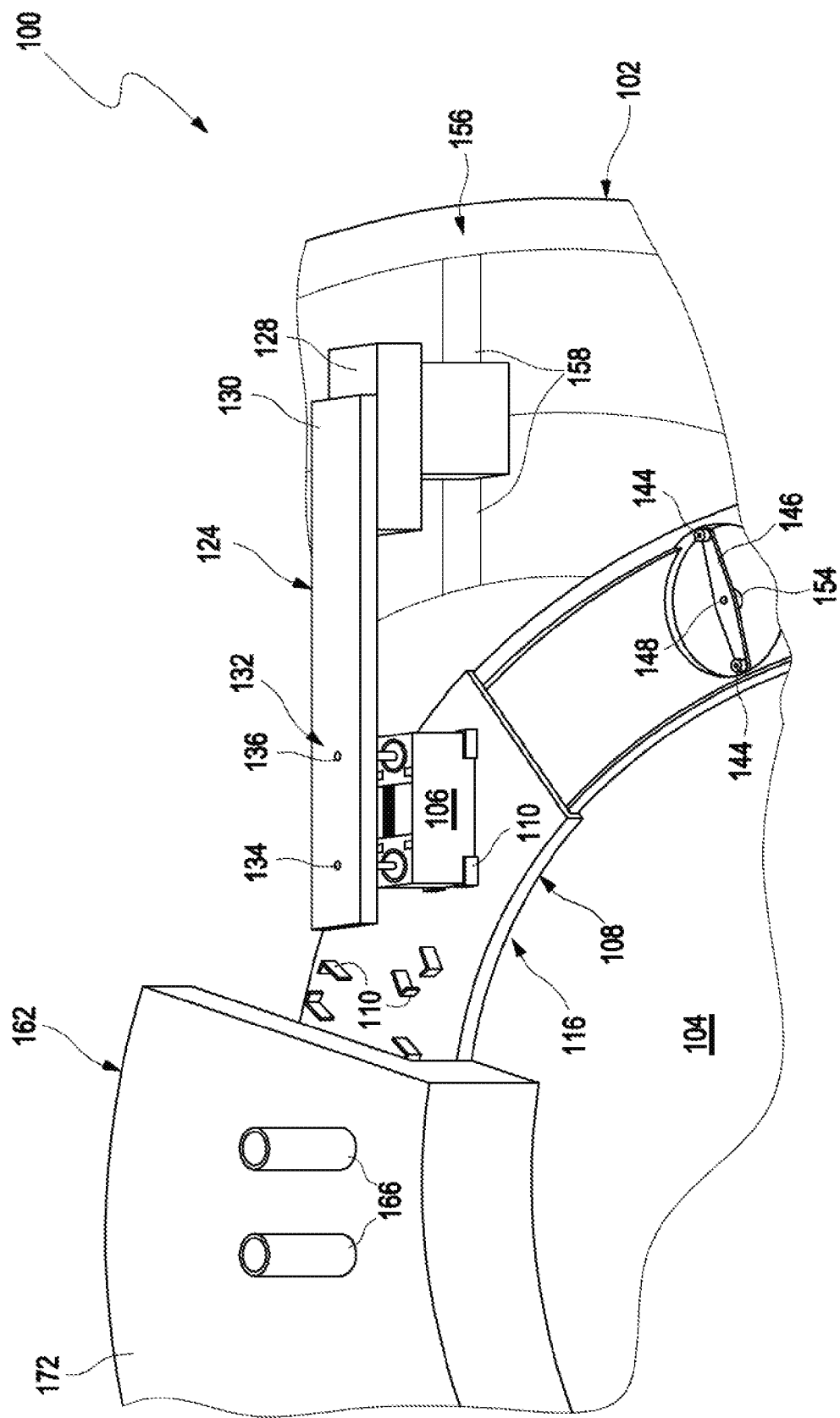
FIG. 14 illustrates the first piercing needle inserted into the reagent vessel during a second piercing process according to an embodiment of the present disclosure.

FIG. 14 shows the first piercing needle 134 inserted into the reagent vessel 106 during a second piercing process. As can be taken from FIG. 14, the first piercing needle 134 can pierce the reagent vessel secondly at an inner position facing away from the reagent rotor 102. The second piercing process carried out by the first piercing needle 134 can basically be the same as the first piercing process. Further, in case the piercing device 132 comprises the second piercing needle 136, the second piercing needle 136 can be used for widening the opening generated by the first piercing needle 134 at the outer position during the first piercing process. Subsequently, the transporting device 124 may be raised or moved in the vertical direction upwards, moved in the lateral, or horizontal, direction and then moved in the vertical direction downwards such that the second piercing needle 136 can pierce the reagent vessel 106 at the inner position.

Figure 15:
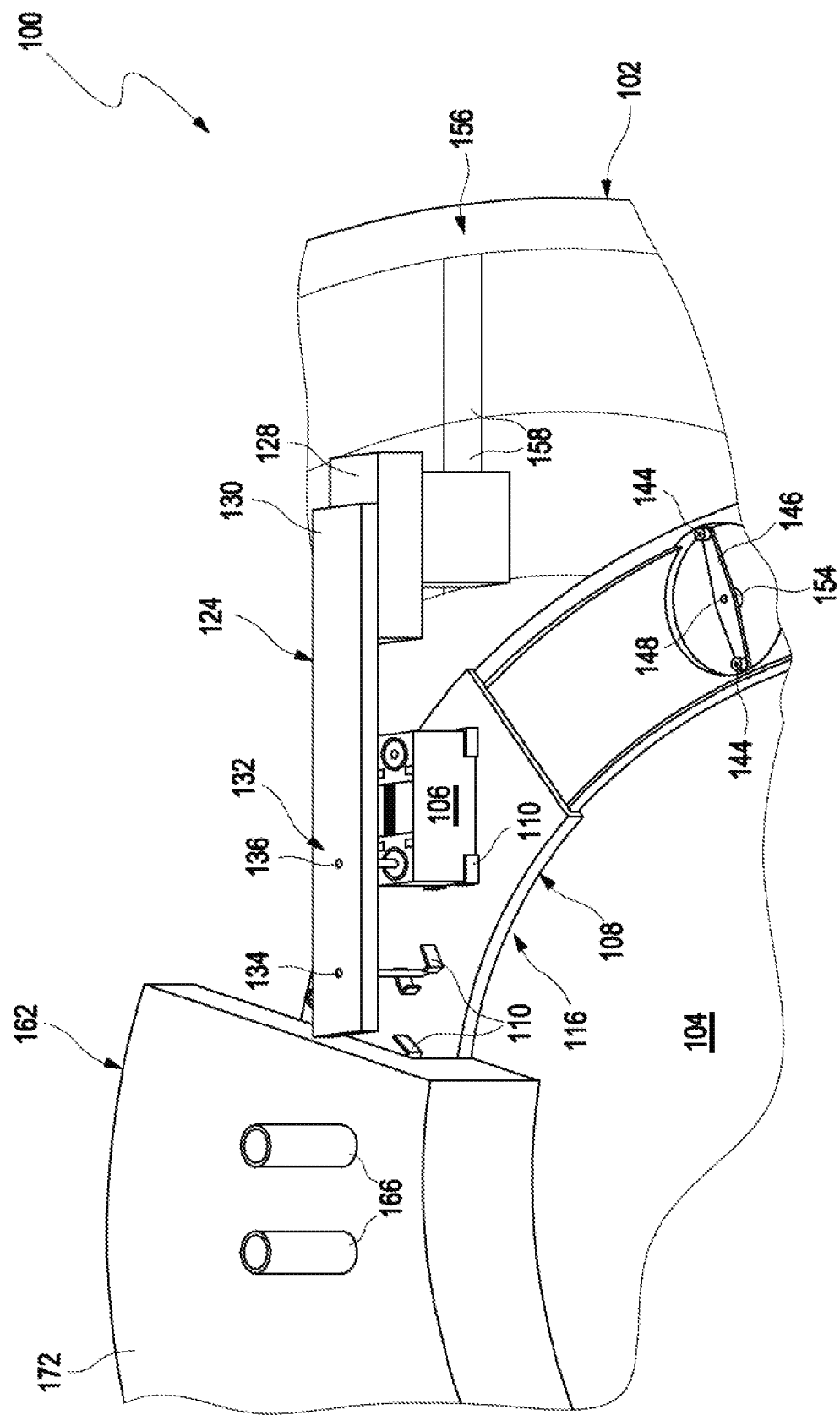
FIG. 15 illustrates the second piercing needle inserted into the reagent vessel during a third piercing process according to an embodiment of the present disclosure.

FIG. 15 shows the second piercing needle 136 inserted into the reagent vessel 106 during a third piercing process. As can be taken from FIG. 14, the second piercing needle 136 can pierce the reagent vessel first at the inner position facing the reagent rotor 102 while the first piercing needle 134 may not pierce the reagent vessel 106 but can be positioned next to the reagent vessel 106. The third piercing process carried out by the second piercing needle 136 can basically be the same as the first or second piercing process. After the piercing processes, it may be necessary to clean the first piercing needle 134 and the second piercing needle 136. For this purpose, the analytical instrument 100 can comprise the cleaning station 166.

Figure 16:
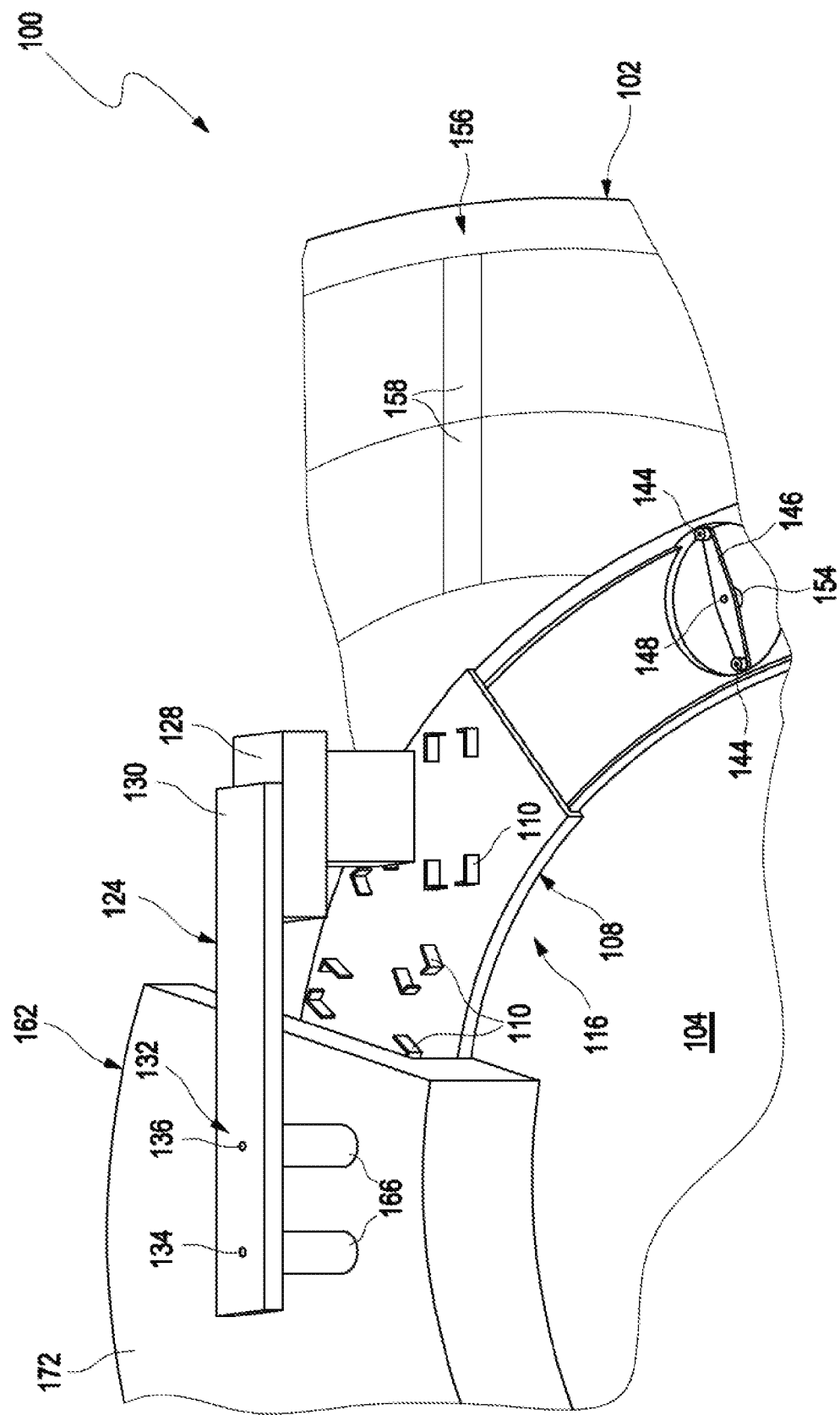
FIG. 16 illustrates the first piercing needle and the second piercing needle moved into the cleaning station according to an embodiment of the present disclosure.

FIG. 16 shows the first piercing needle 134 and the second piercing needle 136 moved into the cleaning station 166. Particularly, the transporting device 124 may move within the second plane 126 to the cleaning station 166. The first piercing needle 134 and the second piercing needle 136 may then be lowered into the cleaning station in order to be cleaned as shown in FIG. 16. For example, the cleaning station 166 may comprise two tubes into which the first piercing needle 134 and the second piercing needle 136 can be inserted.

Figure 17:
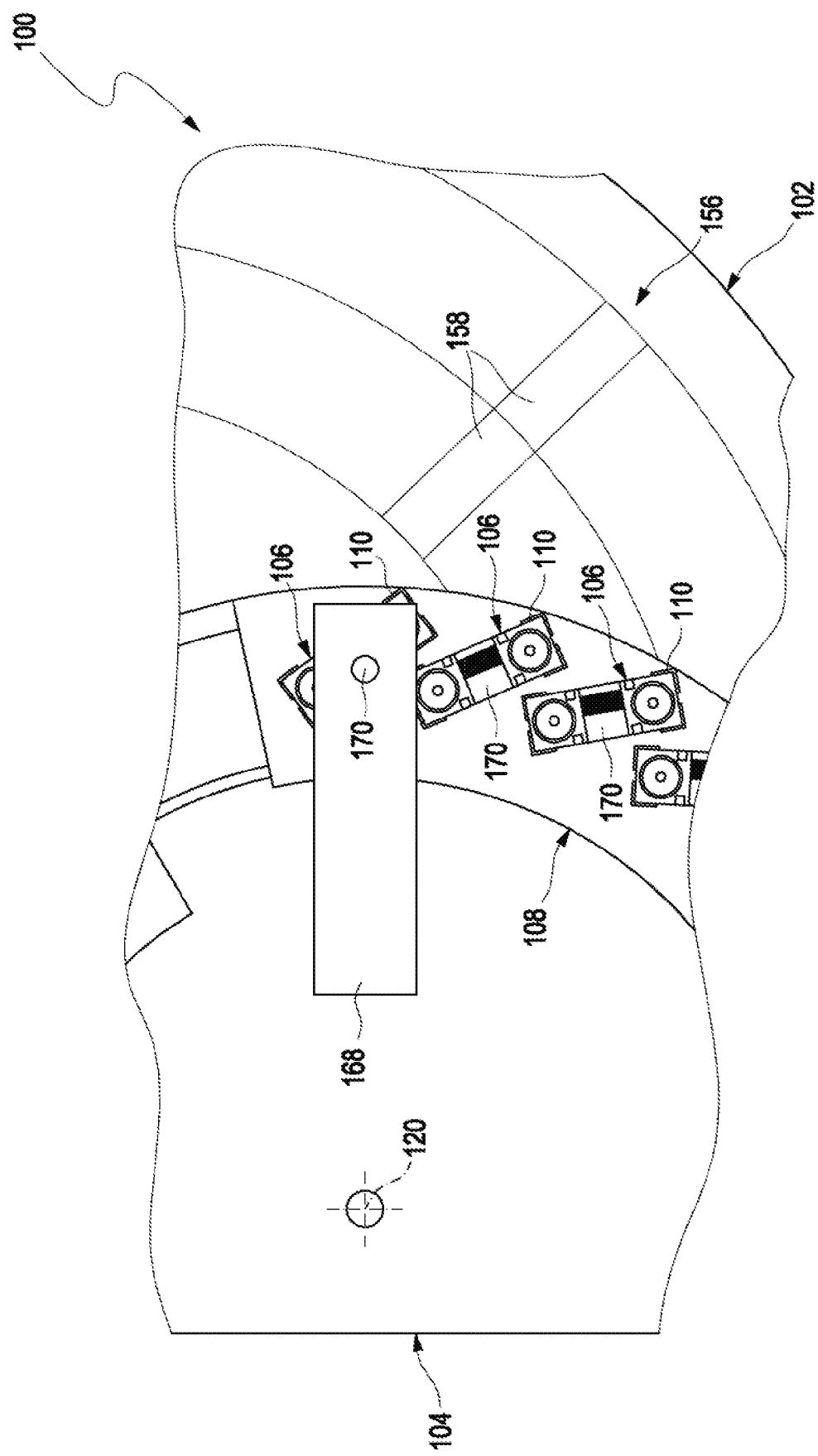
FIG. 17 illustrates the orientation sensor of the analytical instrument according to an embodiment of the present disclosure.

FIG. 17 shows the orientation sensor 168 of the analytical instrument 100. The orientation sensor 168 can be adapted to detect whether a reagent vessel 106 is correctly oriented or not. For this purpose, the orientation sensor 168 can be arranged at a position so as to detect the orientation of the reagent vessel 106 between the loading position 114 and the unloading position of the tray 108. FIG. 16 shows how the orientation sensor 168 may detect the correct orientation of the reagent vessel 106 by the field 170. In the embodiment shown in FIG. 17, a correct orientation can be detected if the white portion of the field 170 is detected by the orientation sensor 168. A wrong orientation can be detected if the black portion of the field 170 is detected by the orientation sensor 168.

Figure 18:
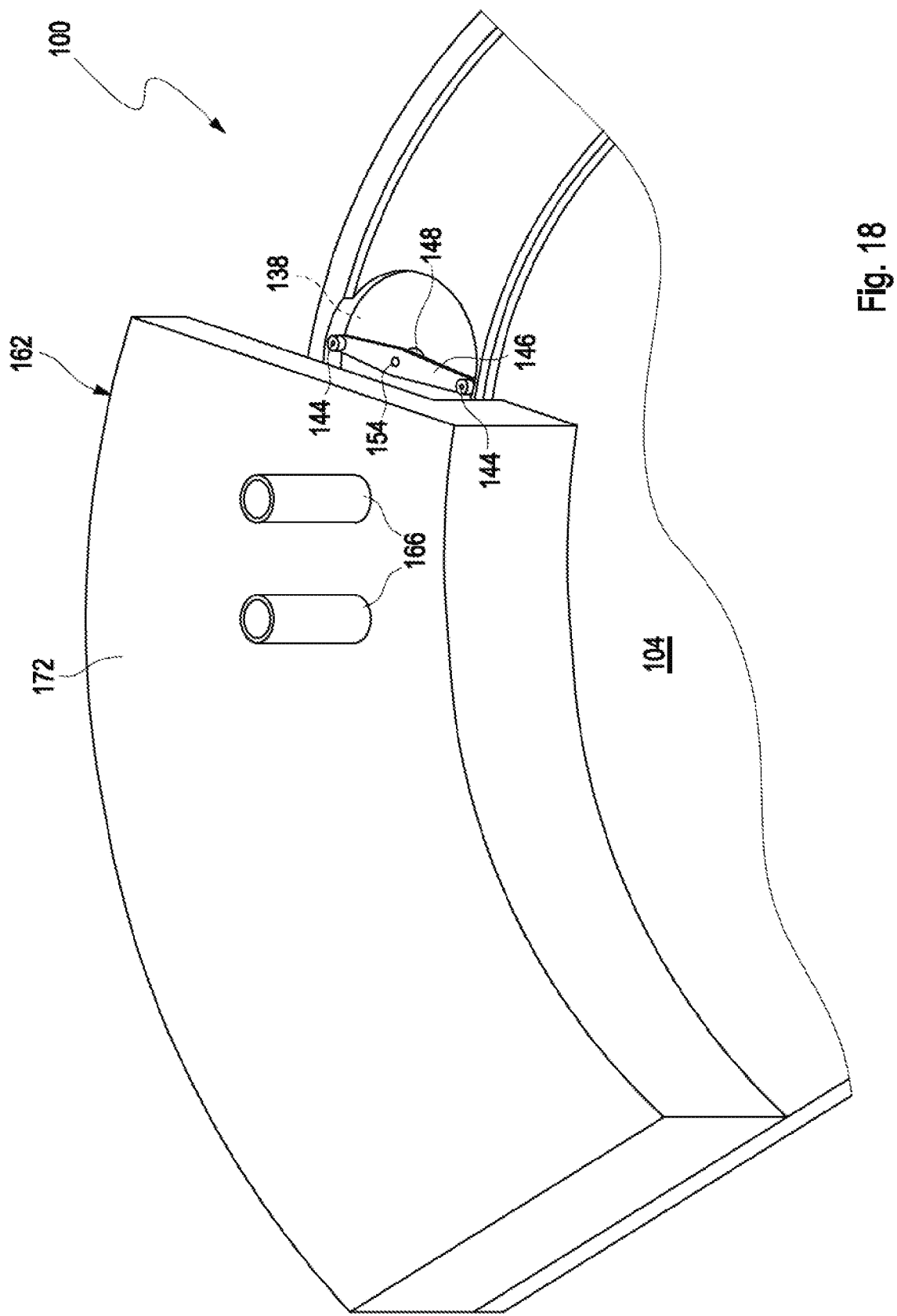
FIG. 18 illustrates a plan view of the cooling device according to an embodiment of the present disclosure.

FIG. 18 shows a plan view of the cooling device 162. The cooling device 162 can be provided as any reagent vessels 106 not used in an analytical process of the analytical instrument 100 have to be temporarily stored and cooled in order to prevent deterioration or variation of the content of the reagent vessels 106. The cooling device 162 can be located within the moving direction, or path, of the tray 108. More particularly, the cooling device 162 can be located at the final position 164 of the tray 108. The cooling device 162 can comprise a casing, or door, 172 and can be adapted to house the reagent vessels 106. The door 172 can be removable in order to expose any reagent vessel 106 loaded within the cooling device 162. The tray 108 can be moveable into the final position 164 behind the unloading position 116.

Figure 19:
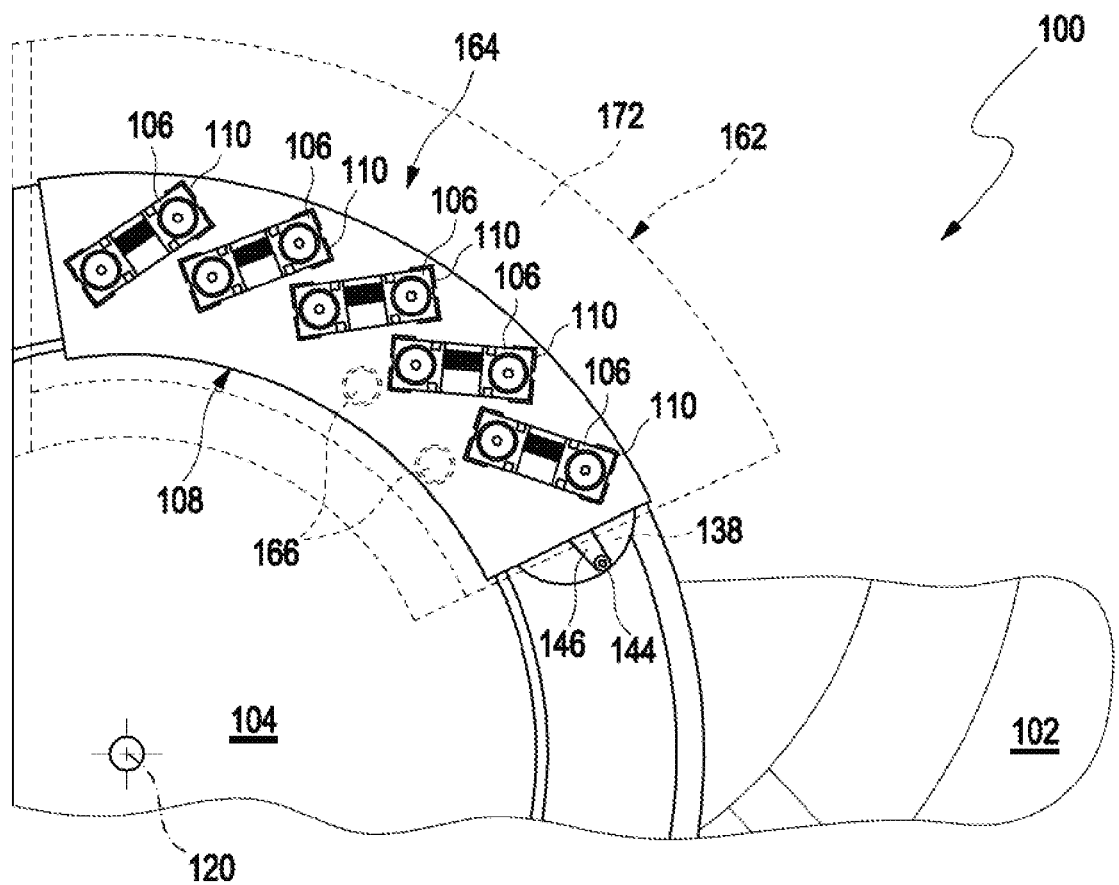
FIG. 19 illustrates the cooling device with the door being removed according to an embodiment of the present disclosure.

FIG. 19 shows the cooling device 162 with the door 172 removed. The transporting device 124 can be adapted to transfer reagent vessels 106 back from the reagent rotor 102 to the tray 108 in a manner substantially opposite to the loading process of the reagent rotor 102. In other words, the transporting device 124 can be moved to the reagent rotor 102 and the reagent rotor 102 may be rotated such that a reagent vessel 106 may be gripped by the gripping device 128. Then the transporting device 124 can transport the reagent vessel 106 to the tray 108 and release the reagent vessel 106 at the unloading position 116. The tray 108 can then move the reagent vessel 106 to the cooling device 162 by the motor 138. Needless to say, the transporting device 124 may transfer more than one reagent vessel 106 back from the reagent rotor 102 to the tray 108 in a subsequent order. Further, any reagent vessels 106, which have not been transferred to the reagent rotor 102, may also be moved into the cooling device 162. Accordingly, the cooling device 162 can be adapted to house all of the plurality of reagent vessels 106 as can be seen in FIG. 19.

As can be taken from the above explanation, the transporting device 124 may carry out all functions and movements exclusively within the second plane 126. Thus, any impreciseness or tolerances in the adjustment of the movement of the transporting device 124 can be minimized or omitted as the same may be moved by a single motor.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. An analytical instrument that operates with liquid reagents contained in reagent vessels, the analytical instrument comprising:
    a reagent rotor; and
    a loading device for loading the reagent rotor with reagent vessels, the loading device comprising:
        a tray configured to receive a plurality of reagent vessels, wherein the tray comprises evenly spaced apart grooves, wherein the tray is movable within a first plane at least between a loading position, at which the tray is loadable with the plurality of reagent vessels, and an unloading position, at which the plurality of reagent vessels is unloadable from the tray;
        at least one motor configured to rotate a crank for moving the tray, wherein the motor comprises two pins arranged on the crank, wherein the grooves are configured to engage the two pins, wherein the motor is configured to move the tray stepwise with predetermined steps by engagement of the grooves and the pins; and
        a transporting device positioned above the plurality of reagent vessels and parallel to the tray, the transporting device comprising a gripping device configured to grip a reagent vessel, the gripping device being arranged at a leading end towards a plurality of reagent rotor loading positions on the reagent rotor, and at least one piercing device arranged adjacent to the gripping device and comprising a piercing needle to pierce a reagent vessel,
    wherein the transporting device is configured to transport the gripped reagent vessel of the plurality of reagent vessels from the tray to the reagent rotor of the analytical instrument, wherein the tray is formed such that the transporting device is linearly moveable within a second plane perpendicular to the first plane from the unloading position of the tray to the reagent rotor and/or from the reagent rotor to the unloading position of the tray, wherein the first plane and the second plane are different from one another, and wherein the tray is formed as a circular ring segment,
    wherein the loading device is configured to load the reagent rotor with reagent vessels, and wherein after the reagent rotor is loaded with reagent vessels, the reagent rotor is configured to transport the reagent vessels to a position within the analytical instrument for further handling and analysis.

2. The analytical instrument according to claim 1, wherein the reagent rotor comprises a plurality of reagent rotor loading positions, at which the plurality of reagent vessels is loadable onto the reagent rotor, wherein the reagent rotor is rotatable such that at least one of the reagent rotor loading positions is arranged within the second plane.

3. The analytical instrument according to claim 1, further comprising a RFID sensor for identifying a RFID tag provided on the reagent vessel, wherein the RFID sensor is arranged within the moving path of the tray between the loading position and the unloading position.

4. The loading device according to claim 1, wherein the tray is moveable on a circular path.

5. The loading device according to claim 4, wherein the circular path defines a middle point, wherein the tray comprises compartments for receiving the plurality of reagent vessels, wherein the compartments are arranged at even angular positions around the middle point of the circular path.

6. The loading device according to claim 1, wherein the two pins are arranged opposite to one another having a middle point of the crank therebetween and wherein the grooves are arranged at a lower side of the tray.

7. The loading device according to claim 1, wherein the loading device is configured to be arranged within the analytical instrument such that the first plane is parallel to the reagent rotor.

* * * * *